United States Patent
Labadie et al.

(10) Patent No.: US 11,375,561 B2
(45) Date of Patent: Jun. 28, 2022

(54) MULTI-FUNCTIONAL, SOFTWARE CONFIGURABLE DEVICE FOR FIXED WIRELESS NETWORKS

(71) Applicant: Amazon Technologies, Inc., Seattle, WA (US)

(72) Inventors: Nathan Labadie, Gilroy, CA (US); Reshma Suresh, San Jose, CA (US); Ali Mirkamali, Sunnyvale, CA (US); Cheol Su Kim, San Jose, CA (US); Omar Fawazhashim Zakaria, Saratoga, CA (US); Kwok Shing Lee, San Mateo, CA (US); Kalyan Teja Posani, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 155 days.

(21) Appl. No.: 16/707,354

(22) Filed: Dec. 9, 2019

(65) Prior Publication Data
US 2021/0176805 A1    Jun. 10, 2021

(51) Int. Cl.
*H04W 4/00* (2018.01)
*H04W 76/15* (2018.01)
(Continued)

(52) U.S. Cl.
CPC .......... *H04W 76/15* (2018.02); *H01Q 1/2291* (2013.01); *H04B 7/0413* (2013.01); *H04W 84/10* (2013.01); *H04W 88/16* (2013.01)

(58) Field of Classification Search
CPC ..... H04W 84/12; H04W 84/18; H04W 80/04; H04W 8/26; H04W 88/06; H04W 76/15;
(Continued)

(56) References Cited

U.S. PATENT DOCUMENTS 8,849,235 B1 * 9/2014 Wilson .................. H04W 4/021
455/404.1
9,331,835 B1 * 5/2016 Lee ...................... H04B 1/0057
(Continued)

FOREIGN PATENT DOCUMENTS

WO     2018175615 A1     9/2018

OTHER PUBLICATIONS

International Search Report and Written Opinion dated Apr. 8, 2021, on application No. PCT/US2020/063421.

*Primary Examiner* — Phuongchau Ba Nguyen
(74) *Attorney, Agent, or Firm* — Lowenstein Sandler LLP

(57) ABSTRACT

Technologies directed to a wireless network device with a single hardware architecture that supports multiple devices roles through software configuration are described. One wireless network device includes a housing with an RF connector and a circuit board with a first radio coupled to an internal antenna and a second radio coupled to an external antenna via the RF connector. The second antenna is mounted on an exterior surface of the building and coupled to the RF connector via an RF cable. The wireless network device establishes a first wireless link between the first radio and a radio of a second device via the first antenna and a second wireless link between the second radio and a radio of a third device via the second antenna. The second device can be a second wireless network device that is programmed to operate as a gateway, the gateway being mounted outside of the building. The third device is located inside the building can be either a customer premises equipment (CPE) station or a wireless endpoint device. Each of the wireless network device, the second wireless network device, and the CPE station include identical hardware.

20 Claims, 14 Drawing Sheets

(51) Int. Cl.
 *H01Q 1/22* (2006.01)
 *H04B 7/0413* (2017.01)
 *H04W 84/10* (2009.01)
 *H04W 88/16* (2009.01)

(58) Field of Classification Search
 CPC ..... H04W 84/10; H04W 88/16; H04W 24/02; H01Q 1/2291; H04B 7/0413; H04B 1/38
 See application file for complete search history.

(56) References Cited

U.S. PATENT DOCUMENTS

| | | | |
|---|---|---|---|
| 9,351,338 B2 * | 5/2016 | Amini | H04W 88/08 |
| 10,193,236 B1 * | 1/2019 | Lee | H01Q 21/24 |
| 10,476,128 B1 | 11/2019 | Kim et al. | |
| 11,044,635 B2 * | 6/2021 | Belghoul | H04W 72/1252 |
| 11,075,465 B2 * | 7/2021 | Lee | H04B 7/0602 |
| 2013/0295989 A1 * | 11/2013 | Smadi | H04W 16/14 |
| | | | 455/553.1 |
| 2014/0349584 A1 * | 11/2014 | Clevorn | H04B 7/0693 |
| | | | 455/67.13 |
| 2015/0271829 A1 * | 9/2015 | Amini | H04W 24/02 |
| | | | 370/329 |
| 2018/0006702 A1 * | 1/2018 | Doostnejad | H04B 7/088 |
| 2019/0007124 A1 | 1/2019 | Seo et al. | |
| 2019/0173582 A1 * | 6/2019 | Ashrafi | H01Q 25/005 |
| 2019/0238676 A1 * | 8/2019 | Clark | H04M 1/72475 |
| 2021/0306263 A1 * | 9/2021 | Iwasaki | H04L 49/355 |

* cited by examiner

MULTI-FUNCTIONAL, SOFTWARE CONFIGURABLE DEVICE FOR FIXED WIRELESS NETWORKS

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
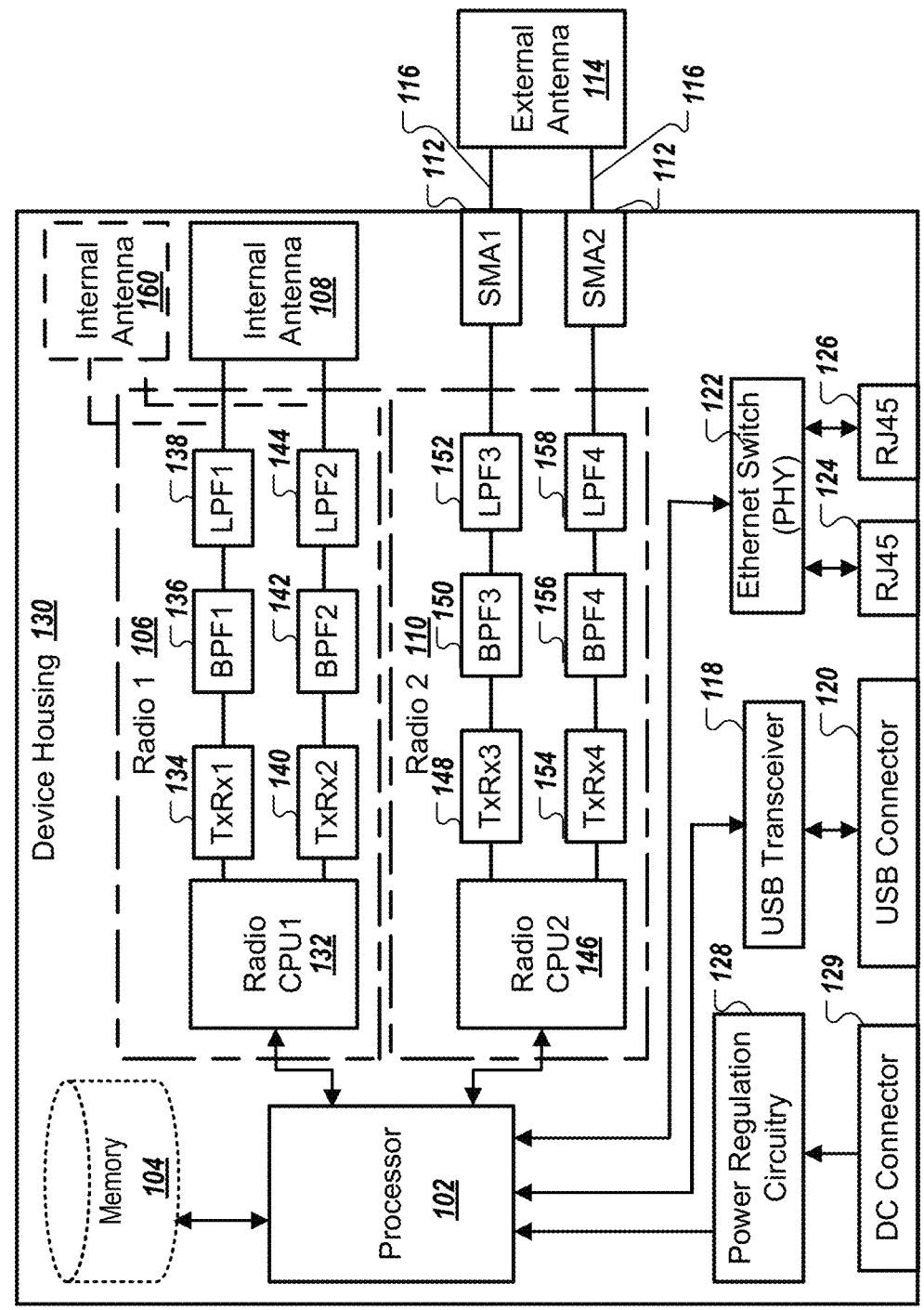
FIG. 1 is a block diagram illustrating a simplified hardware architecture of a multi-functional, software configurable network device for fixed wireless networks according to one embodiment.

Technologies directed to a wireless network device with a single hardware architecture that supports multiple devices roles through software configuration are described. The 2.4 GHz and 5 GHz industrial, scientific, and medical (ISM) radio bands allow unlicensed wireless communications. Due to its unlicensed nature, many short ranged, low power wireless communication systems operate in these frequency bands. As such, there is a limited de-license spectrum in various locations, including India (e.g., 2.4 GHz ISM and 5 GHz U-NII bands). Various devices are described herein that include wireless local area network (WLAN) radios operate in the 2.4 GHz and 5 GHz U-NII-1 bands and utilize various WLAN protocols, such as the Wi-Fi® protocols (e.g., 802.11n, 802.11ac, or the like). The radios can utilize 2×2 spatial multiplexing Multiple-input-multiple-output (MIMO) and channel bandwidths from 20 MHz to 40 MHz. The radios can see all 5.x GHz channels, including Dynamic Frequency Selection (DFS) channels and can operates at an Equivalent Isotropically Radiated Power (EIRP) up to 36 dBmi, depending on the channel. The devices described herein can be deployed in a wireless network having a hierarchical topology between an Internet Service Provider (ISP) ingress to a subscriber. In various embodiments, the wireless network is logically organized as a cascaded star topology as described in more detail below.

The network architecture described herein is capable of providing Video on Demand (VoD) and Internet services to customers at scale. The network architecture described herein can be deployed in areas with limited, traditional ISP infrastructure, such as in India, for example. These services can be enabled by a combination of wired ingress, wireless connectivity, and tiered content caching in the network architecture described herein. As described herein, the network architecture includes technology for distribution of VoD and Internet services to the customers using wired and wireless links. The network devices are organized into three logical units known as nodes: base station nodes (BSNs), relay nodes (RLNs), and customer premises equipment (CPE) nodes (also referred to as Home access node (HAN)). Each node supports a unique set of network functions. The CPE node provides connectivity for in-home customer devices (FireTV, laptop) to the outdoor wireless access network. RLN aggregate the wireless access traffic from the CPEs and pass this data back to a central BSN over a wireless distribution network. The BSN aggregates both the RLN wireless distribution and local wireless access traffic to a fiber ingress point. The devices at the nodes can be manufactured as a common device type and programmed according to any of the following device roles: a router (RT) role, a base station (BS) role, a gateway (GW) role, a relay (RL) role, or a customer station (STA) role.

In one embodiment, a wireless network device with the single hardware architecture can include a housing with an RF connector and a circuit board with a first radio coupled to an internal antenna and a second radio coupled to an external antenna via the RF connector. The second antenna is mounted on a first exterior surface of a dwelling unit (i.e., building) and coupled to the RF connector via an RF cable. The wireless network device can be mounted on a second exterior surface of the building, such as on a balcony of the customer's premises. Alternatively, the wireless network device can be mounted to a pole or other structure of the building. The wireless network device establishes a first wireless link between the first radio and a radio of a second device via the first antenna and a second wireless link between the second radio and a radio of a third device via the second antenna. The second device can be a second wireless network device that is programmed to operate as a gateway, the gateway being mounted outside of the dwelling unit. The gateway can be mounted to a third exterior surface of the building, such as on a roof of the building. Alternatively, the gateway can be mounted to a pole that extends out from the building, or the like. It should also be noted that in some cases, the second wireless network device can be programmed to operate a mixed-mode device (e.g., BS/RL+ GW) (also referred to as a hybrid device. The third device is located inside the dwelling unit can be either a CPE station or a wireless endpoint device. Each of the wireless network device, the second wireless network device, and the CPE station include identical hardware, such as described below with respect to FIGS. 1-12. The devices described herein can be deployed in a cascaded star topology as illustrated and described with respect to FIGS. 13-14.

FIG. 1 is a block diagram illustrating a simplified hardware architecture of a multi-functional, software configurable network device 100 for fixed wireless networks according to one embodiment. The wireless network device 100 has a simplified hardware architecture that can be programmed according to multiple functionalities by software. The hardware of the wireless network device 100 can be identical hardware to the hardware of other wireless network devices in a wireless network. That is, the wireless network devices can be manufactured as a common type device (e.g., single SKU product) and programmed according to any one of the following device roles: to operate as The wireless network device 100 can be configured and re-configured according to various device roles, including: a router (RT) role, a base station (BS) role, a relay (RL) role, a gateway (GW) role, a common-area gateway (CA-GW), a customer station (STA) role (e.g., in-home unit (IHU) or outside-home unit (OHU), or a storage (NAS) role. Generally, a gateway is a device that connects to a base station device or a relay device via wired networking of the building and wirelessly connects to one or more customer STAs (e.g., IHUs or OHUs). A common-area gateway is a specific type of gateway that resides inside a building in common areas, as opposed to a gateway that is disposed outside of a building, such as on a roof of the building. The common-area gateway also connects to the wired network of the building and wirelessly connects to one or more customer STAs. The common-area gateways can be located in closer proximity to some customer STAs within the building, than a gateway that is located on a roof.

A "device role" is a set of specific network functions associated with one or more network devices, such as a primary wireless network device (also referred to herein as "wireless device," "network device," or "D2") that is configured according to a device role (e.g., a gateway device, a customer station, or the like). It should be noted that the particular device role can vary based on the type of node in the wireless node. The wireless network is logically organized as nodes in a hierarchical topology, such as a cascaded star topology, or the like, whereas the one or more devices of a particular node are physically organized at a location of a customer premise, such as a single dwelling unit (SDU), a MDU, or at other buildings or structures as described below.

As illustrated in FIG. 1, the wireless network device 100 includes one or more processors 102 (hereinafter referred to as "processor"), one or more memory devices (hereinafter referred to as "memory device") 104, a first radio 106 coupled to an internal antenna 108, a second radio 110 coupled to one or more RF connectors 112 (e.g., SMA connectors), which are coupled to an external antenna 114 via one or more RF cables 116. The wireless network device 100 includes one or more wired interfaces, including: a serial interface transceiver 118 coupled between the processor 102 and a serial interface connector 120; a network switch 122 coupled between the processor 102 and both a first network interface connector 124 and a second network interface connector 126; and power regulation circuitry 128 coupled to a power connector 129.

The processor 102 can be various type of processing devices, such as one or more Central Processing Units (CPUs), microcontrollers, field programmable gate arrays, or other types of processors or processing devices. The processor 102 can implement processing logic that comprises hardware (e.g., circuitry, dedicated logic, programmable logic, microcode, etc.), software, firmware, or a combination thereof. The processing logic can configure the wireless network device 100 to operate according to a device role using device role information and according to a node of a cascaded start topology using node configuration information as described herein. This information can be stored in the memory device(s) 104. The memory device 104 can be any type of memory or storage device and can store instructions that implement the processing logic, the device role information, and the node configuration information. The processor 102 can communicate with other devices over the wired interfaces, the wireless interfaces (e.g., first radio 106, second radio 110), or any combination thereof.

As illustrated in FIG. 1, the wireless network device 100 includes a device housing 130. Inside the housing 130, the wireless network device 100 can include a circuit board having the processor 102, the first radio 106, the internal antenna 108, the second radio 110, the one or more RF connectors 112, the serial interface transceiver 118, the serial interface connector 120, the network switch 122, the first network interface connector 124, the second network interface connector 126, the power regulation circuitry 128, and the power connector 129. These components can be considered internal components. The circuit board can be a printed circuit board (PCB) and the internal antenna 108 can be a PCB antenna disposed on a first plane of the PCB. The memory device(s) 104 can be disposed on the circuit board. Alternatively, the memory device(s) 104 can be disposed outside of the circuit board and connect to the processor 102 via a connector on the circuit board. The serial interface transceiver 118 and serial interface connector 120 can implement one of various technologies, such as the USB technologies (e.g., USB2.0 or USB3.0 standards or the like). In these implementations, the serial interface transceiver 118 can include a USB transceiver and the serial interface connector 120 can be a USB connector, such as USB-A connector. A USB-attached storage medium can be attached to the serial interface connector 120 to provide additional storage. Alternatively, the serial interface transceiver 118 can include other transceivers, such as a Universal Asynchronous Receiver-Transmitter (UART) or the like. The network switch 122 can be an Ethernet switch (e.g., Giga Ethernet switch) and the first network interface connector 124 and the second network interface connector 126 can be RJ45 connectors. A Power over Ethernet (PoE) controller can be used to provide power via one or both of the RJ45 connectors. The wireless network device 100 can also include other interfaces, such as one or more memory interfaces (DDR memory interface and NAND flash interface, to connect volatile and non-volatile memory to the processor 102. In a further embodiment, the processor 102 can be coupled to an additional PAN radio that implements the Bluetooth® technology.

The serial interface connector 120, the first network interface connector 124, the second network interface connector 126, the power regulation circuitry 128, and the power connector 129 can be external connectors that can connect to components outside of the housing 130. The external antenna 114, the RF cable(s) 116, along with other items like Ethernet cables, USB cables, and power cables can be considered external components since they are external to the housing 130; whereas, the processor 102, first radio 106, second radio 110, internal antenna 108, RF connectors 112, network switch 122, serial interface connector 120, first network interface connector 124, second network interface connector 126, power regulation circuitry 128, and power connector 129 can be considered internal components since they are internal to the housing 130. As noted herein, the memory device(s) 104 can be external or internal components. The first radio 106 and second radio 110 can implement or be one or more types of radio technologies, such as, for example, WLAN technologies, Wireless Personal Area Network (WPAN) technologies, cellular technologies, Long Range (LoRa) technologies, Body Area Network (BAN) technologies, Near-Me (NAN) technologies, or the like. In one embodiment, the first radio 106 and the second radio 110 are Wi-Fi® radios that implement the Wi-Fi® technology. For example, the first radio 106 can implement the 2.4 GHz Wi-Fi® technology and the second radio 110 can implement the 5 GHz Wi-Fi® technology. In some implementations, the first radio 106 can be a 2×2 MIMO radio that operates according to IEEE 802.11n and the second radio 110 can be a 2×2 MIMO radio that operates according to IEEE 802.11ac.

As illustrated, the first radio 106 includes a first central processing unit (CPU) 132 coupled to the processor 102, a first transceiver 134 coupled to the first CPU 132, a first pass filter (BPF) 136 coupled to the first transceiver 134, a first low pass filter (LPF) 138 coupled to the first BPF 136 and the internal antenna 108, a second transceiver 140 coupled to the first CPU 132, a second BPF 142 coupled to the second transceiver 140, and a second LPF 144 coupled to the second BPF 142 and the internal antenna 108. The second radio 110 includes a second CPU 146 coupled to the processor 102, a third transceiver 148 coupled to the second CPU 146, a third BPF 150 coupled to the third transceiver 148, and a third LPF 152 coupled to the third BPF 150 and the RF connector 112, the RF connector 112 being coupled to the external antenna 114 via a first RF cable 116, a fourth transceiver 154 coupled to the second CPU 146, a fourth BPF 156 coupled to the fourth transceiver 154, and a fourth LPF 158 coupled to the fourth BPF 156 and a second RF connector 112, the second RF connector 112 being coupled to the external antenna 114 via a second RF cable 116. The first BPF 136 and the second BPF 142 are configured to filter RF signals, received via the internal antenna 108, within a first frequency range (e.g., 5 GHz frequency band) and the third BPF 150 and the fourth BPF 156 are configured to filter RF signals, received via the external antenna 114, within a second frequency range (e.g., 2.4 GHz frequency band). The first frequency band is different than the second frequency band. It should be noted that various components of the wireless device 100 can be implemented in one or more semiconductor dies. For example, in one implementation, the processor 102, the first CPU 132, and the second CPU 142 can be implemented on a first integrated circuit, such as a System on Chip (SoC). In another embodiments, other components of the first radio 106 and the second radio 110 can also be implemented on the first integrated circuit. The other components of the wireless device 100 can be implemented in one or more additional integrated circuits or components.

In one embodiment, the internal antenna 108 is a first directional antenna that is disposed on a first plane of the circuit board within the device housing 130 and the external antenna 114 is a second directional antenna that is disposed on a second plane of an exterior surface of a building, such as a single dwelling unit, a multi-dwelling unit, or the like. The dwelling unit can be a customer's home, such a single family unit, or a multi-family unit, an office building, or the like. The second plane can be orthogonal or approximately orthogonal to the first plane. In another embodiment, the external antenna 114 is a dual-band omnidirectional antenna (e.g., 5 GHz/2.4 GHz WLAN antenna) and the internal antenna 108 can be single-band directional antenna (e.g., 5 GHz WLAN antenna or a 2.4 GHz antenna). Alternatively, the internal antenna 108 can also be omnidirectional. In another embodiment, the first radio 108 can be selectively coupled to a second internal antenna 160. The internal antenna 108 can be designed as a 5 GHz WLAN antenna and the second internal antenna 160 can be designed as a 2.4 GHz WLAN antenna. It should be noted that when the first radio 106 includes two TX-RX chains (i.e., first TX-RX chain includes the first transceiver 134, the first BPF 136, and the first LPF 138), the internal antenna 108 (and second internal antenna 160) can include multiple antenna elements, each antenna element coupled to one of the two chains. Similarly, the second radio 110 can include two TX-RX chains, as illustrated, and the external antenna 114 can include one or more antenna elements.

In one embodiment, the one or more memory devices 104 store device role information and node configuration information. The device role information can include device settings for each of the following device roles: a router device role, a BS device role, a RL device role, a GW device role, a customer STA device role (e.g., indoor or outdoor customer STAs), a common-area gateway (CA-GW) device role, a NAS device role, or the like. The node configuration information can include node settings for each of the device roles within each of the following node types: BSN, RLN, or CPE node. The node configuration information can also include information about the hardware available at the wireless network device 100, including hardware that is plugged into the hardware ports of the wireless network device 100. For example, the node configuration information can be determined during a boot-up process, such as by the Basic Input/output System (BIOS). The device role information and the node configuration information can be stored in memory, registers, a specified file, or the like. The node configuration information can also include an indication of whether a storage device is attached to a hardware port of the wireless network device 100. The device role information can be used to allow the wireless network device 100 to be configured as one of the types of devices described herein. The node configuration information can include information about the connections of the wireless network device 100. For example, the node configuration information can list each of the external connections to other devices, such as over wired interfaces or wireless interfaces. In one embodiment, the node configuration information includes an IP address for a WAN port. In other embodiments, the node configuration information includes IP addresses of a private subnet. As described herein, the node configuration information can be used by the wireless network device 100 to be configured according to a specific role for the wireless network device 100, depending on where the wireless network device 100 is disposed in the cascaded star topology.

During operation and after a power-up event, the processor 102 can configure the device role and node configuration using the device role information and the node configuration information. The operations to perform the device role process can be done by the processing logic of the processor 102. The processor 102 can receive a first command identifying a first node of a wireless network and a first node type for the first node. The first node is a node in a cascaded star topology of the wireless network. Responsive to the first command, the processor 102 configures the wireless network device 100 as part of a set of devices at the first node and according to the first node type using the node configuration information. The processor 102 receives a second command identifying a first device role for the wireless network device 100. Responsive to the second command, the processor 102 configures the wireless network device 100 according to the first device role using the device role information. To configure the wireless network device 100 according to the first device role, the processor 102 establishes a wired connection with other devices (e.g., second network device 113) in the set of devices at the first node. The processor 102 configures at least one of the radios of the wireless interface to communicate with another device (e.g., third network device) in a second node over a wireless link. In another embodiment, the processor 102 receives a command identifying a device role for the wireless network device 100. Responsive to the command, the processor 102 configures the wireless network device 100 according to the device role using the device settings. As described herein, the processor 102 can establish appropriate wired and wireless links with other devices.

In a further embodiment, the processor 102, after the first command and the second command, receives a third command identifying a third node of the wireless network and a second node type for the third node. The third command can be initiated as part of a repurposing process that repurposes the wireless network device 100 as a different device type or as a different node type. Responsive to the third command, the processor 102 configures the wireless network device 100 as part of a second set of devices at the third node and according to the second node type using the node configuration information. After the first command and the second command, the processor 102 receives a fourth command identifying a second device role for the wireless network device 100. Responsive to the fourth command, the processor 102 configures the wireless network device 100 according to the second device role using the device role information. To configure the wireless network device 100 according to the second device role, the processor 102 establishes appropriate wired and wired connections with other devices according to the role and node assigned to the wireless network device 100.

In other embodiments, the wireless network device 100 includes other components, such as peripheral ports, wired interface ports (e.g., Ethernet ports), directional antennas, omnidirectional antennas, serial interfaces (e.g., USB, PCIe, PSGMII), card readers, volatile memory, non-volatile memory, UART, general purpose input-output terminals, integrated radios with or without dedicated CPU cores, multilayer switch/router, RF modules, pin connectors to allow external antennas to be coupled to the wireless network device 100, or the like. It should be noted that in some embodiments, a single hardware architecture is fixed to include only the internal components illustrated in FIG. 1, except the memory device(s) 104. That is a single PCB can be used in the same or different housings for the various types of devices described herein, such as the BS/RL device, the gateway device, the outdoor customer STA, the indoor customer STA, the CA-GW device, or a NAS device, such as illustrated in FIG. 2.

Figure 2:
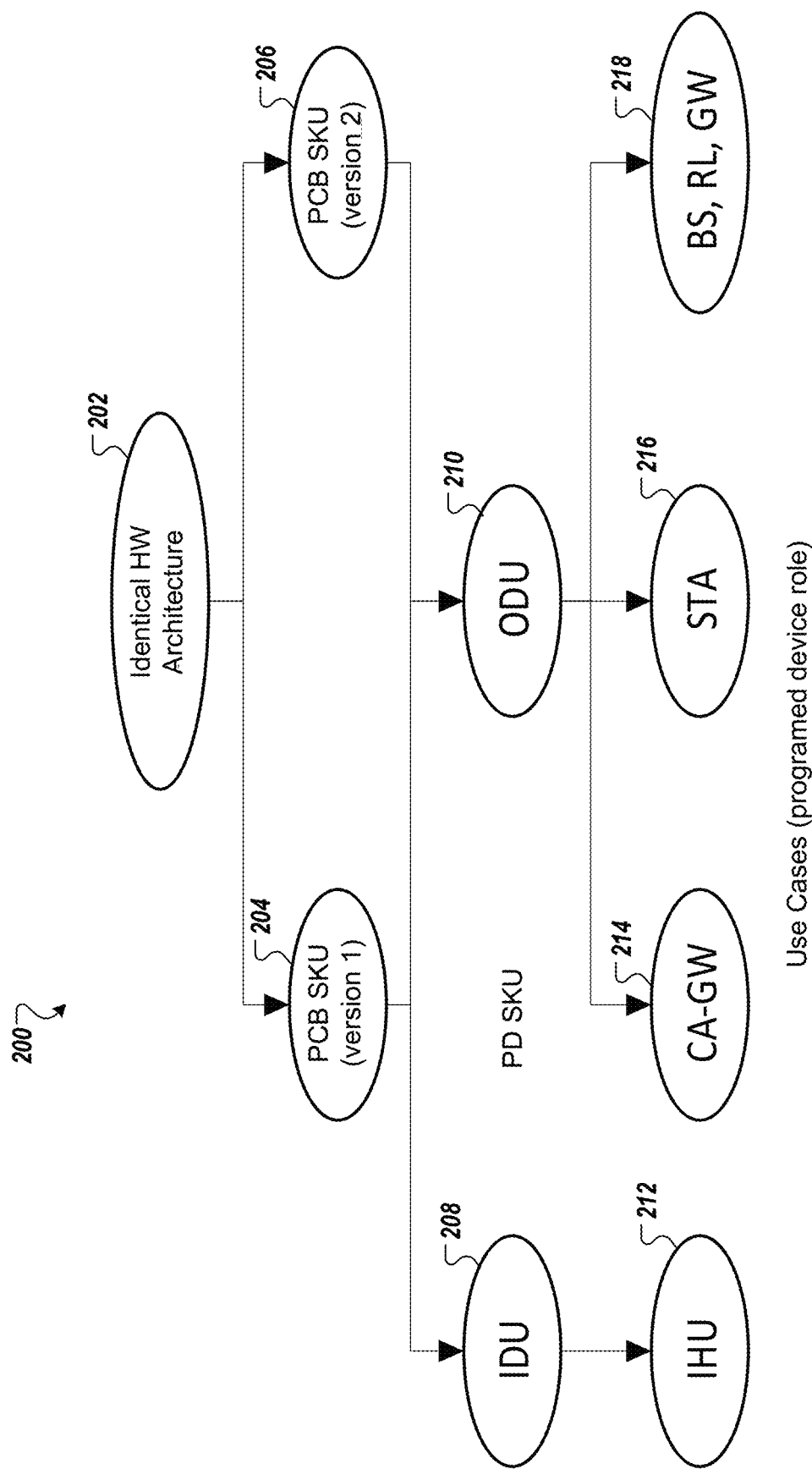
FIG. 2 is a chart illustrating various uses of the multi-functional, software configurable network device in a fixed wireless network according to one embodiment.

FIG. 2 is a chart illustrating various uses of the multi-functional, software configurable network device 200 (hereinafter "wireless network device") in a fixed wireless network according to one embodiment. The wireless network device 200 can be any variation of the wireless network device 100 described above with respect to FIG. 1. The wireless network device 200 has identical hardware architecture 202 that can be used for different PCB versions, for example, PCB SKU (version 1) 204 and PCB SKU (version 2) 206). Either one of the PCB SKUs 204, 206 can be used for both physical device units, including indoor units (IDU) 208 and outdoor units (ODU) 210. The IDU 208 can include one type of device housing, whereas the ODU 210 can have another type of device housing. For example, the ODU 210 can include a device housing that is designed for outdoor use (e.g., features that protect the electronics from the elements (e.g., water, wind, temperature, humidity, or the like). Alternatively, the IDU 208 and the ODU 210 can include the same type of device housing. The IDU 208 can be programmed for specific device-use cases according to device roles where the wireless network device 200 will be indoors. For example, the IDU 208 can be programmed to be the indoor customer STA 212 (also referred to as in-home unit (IHU)). The ODU 210 can be programmed for specific device-use cases according to devices roles where the wireless network device 200 will be outdoors. For example, the ODU 210 can be programmed to be a CA-GW device 214, an outdoor customer STA 216 (also referred to as STA), or any combination of a base station device, a relay device, and a gateway device, collectively referred to as BS, RL, GW 218. The following description sets for some specifics of these various device-use cases.

Figure 3:
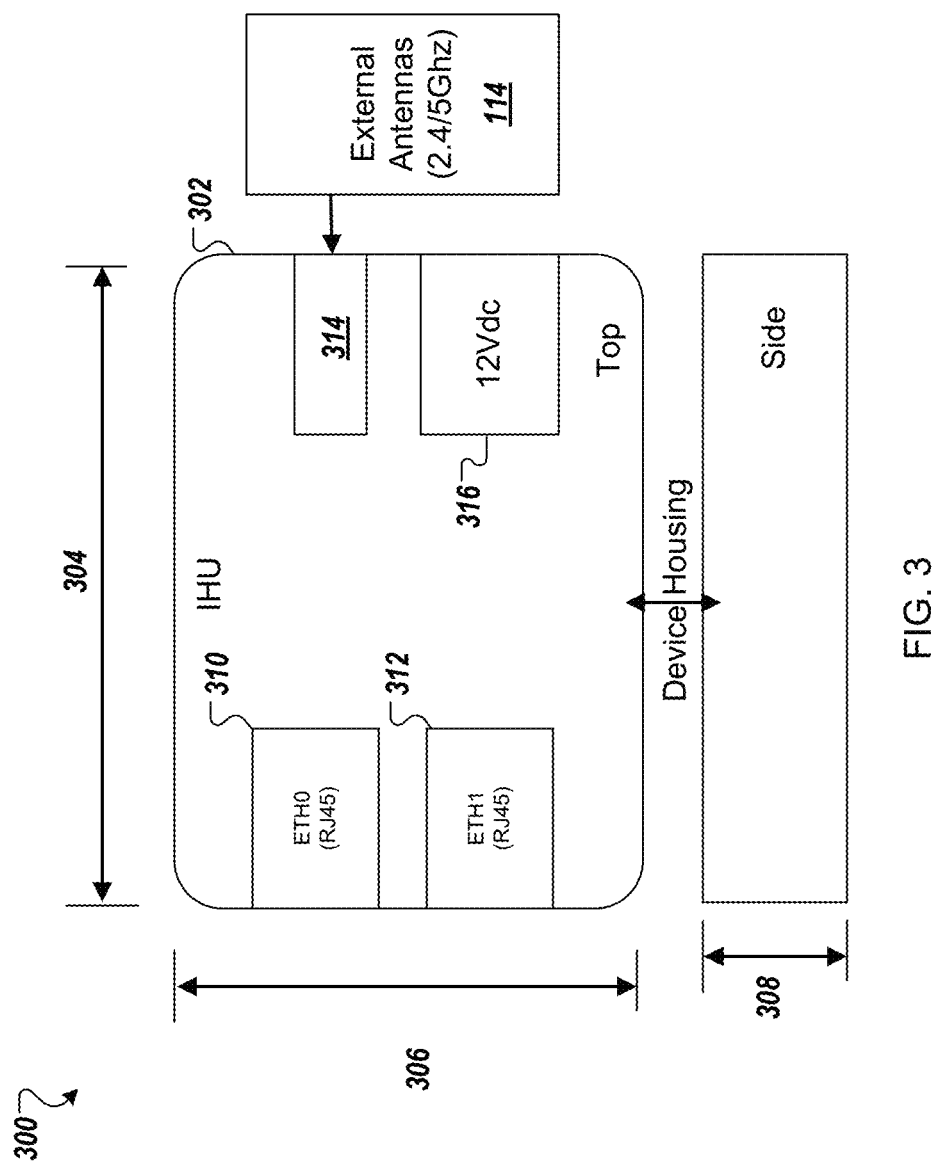
FIG. 3 is a block diagram of a wireless network device being configured as an in-home unit (IHU) according to one embodiment.

FIG. 3 is a block diagram of a wireless network device being configured as a customer HU 300 according to one embodiment. The customer IU 300 can be a physical device SKU of an IDU 208, including a device housing 302 having a width 304 (e.g., 120-140 mm), a length 306 (e.g., 120-140 mm), and a height 308 (e.g., 20-40 mm). The customer IHU 300 includes the first and second network interface connectors 310, 312, an RF connector 314, and a power connector 316, such as described above with respect to FIG. 1. The RF connector(s) 314 is coupled to the external antenna(s) 114 (e.g., 2.4/5 GHz antenna).

Figure 4:
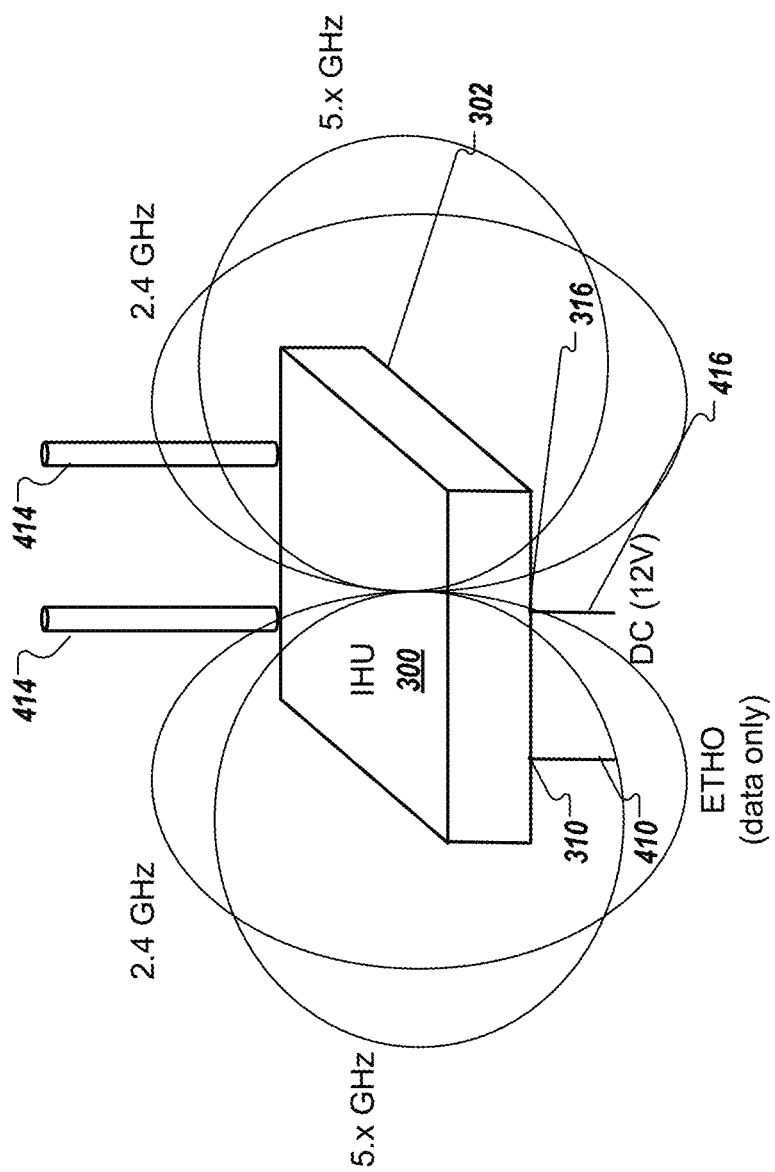
FIG. 4 illustrates the wireless network device being configured as a customer IHU according to one embodiment.

FIG. 4 illustrates the customer IU 300 of FIG. 3 according to one embodiment. When the customer IU 300 is disposed in a customer home, two external omnidirectional antennas 414 can be plugged into the RF connectors 314, an Ethernet cable 410 can be plugged into the network interface connector 310 (data only), and a power cable 416 can be plugged into the power connector 316. The external omnidirectional antennas 414 can radiate in the 2.4 GHz frequency band or the 5 GHz frequency band.

Figure 5:
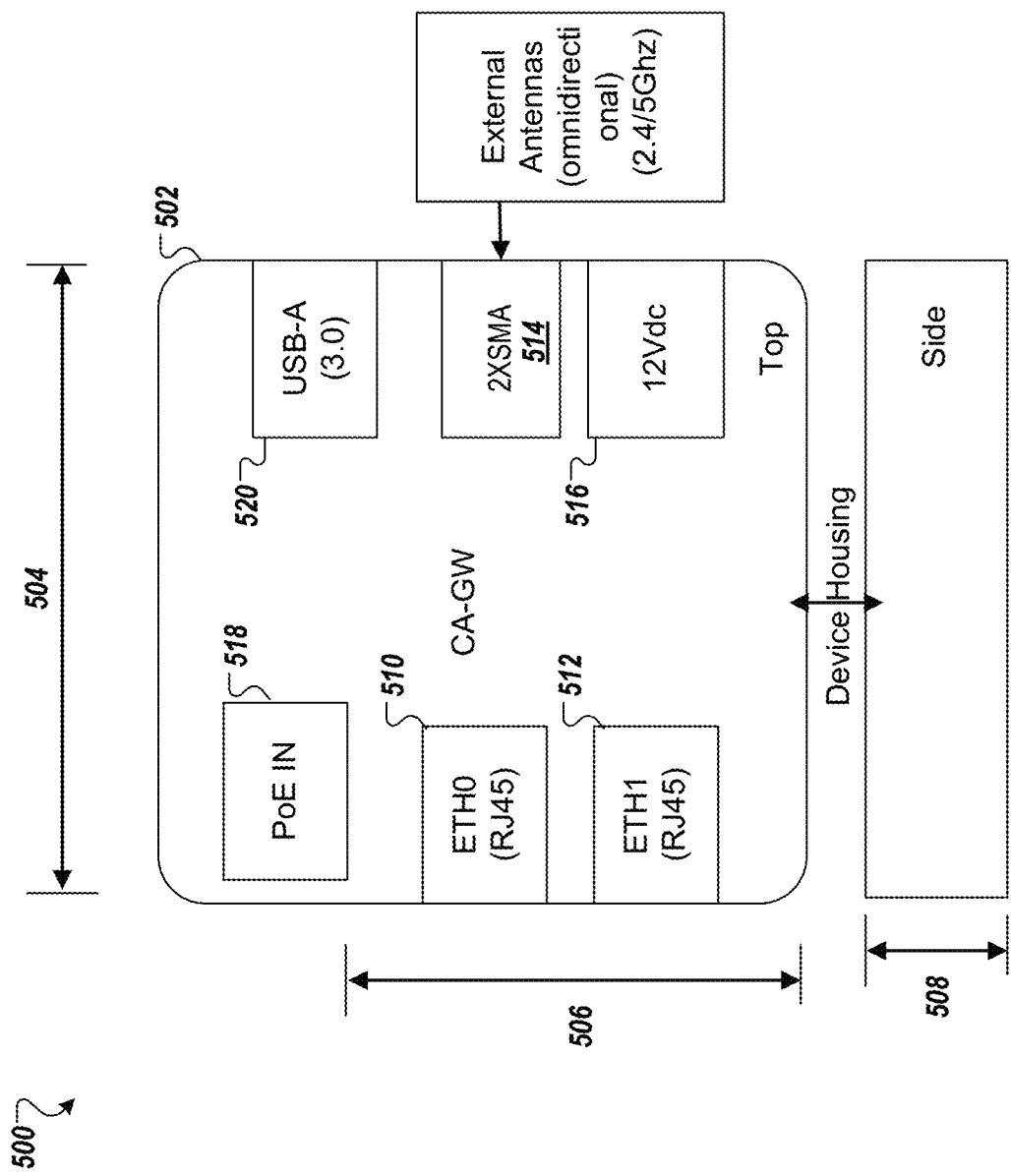
FIG. 5 is a block diagram of a wireless network device being configured as a common area gateway (CA-GW) according to one embodiment.

FIG. 5 is a block diagram of a wireless network device being configured as a common area gateway (CA-GW) 500 according to one embodiment. The CA-GW 500 can be a physical device SKU of an ODU 210, including a device housing 502 having a width 504 (e.g., 130-170 mm), a length 506 (e.g., 130-170 mm), and a height 508 (e.g., 20-40 mm). The CA-GW 500 includes the first and second network interface connectors 510, 512, an RF connector(s) 514, and a power connector 516, a PoE controller 518, and a serial interface connector 520 such as described above with respect to FIG. 1. The RF connector(s) 514 is coupled to the external antenna(s) 114 (e.g., 2.4/5 GHz omnidirectional antenna).

Figure 6:
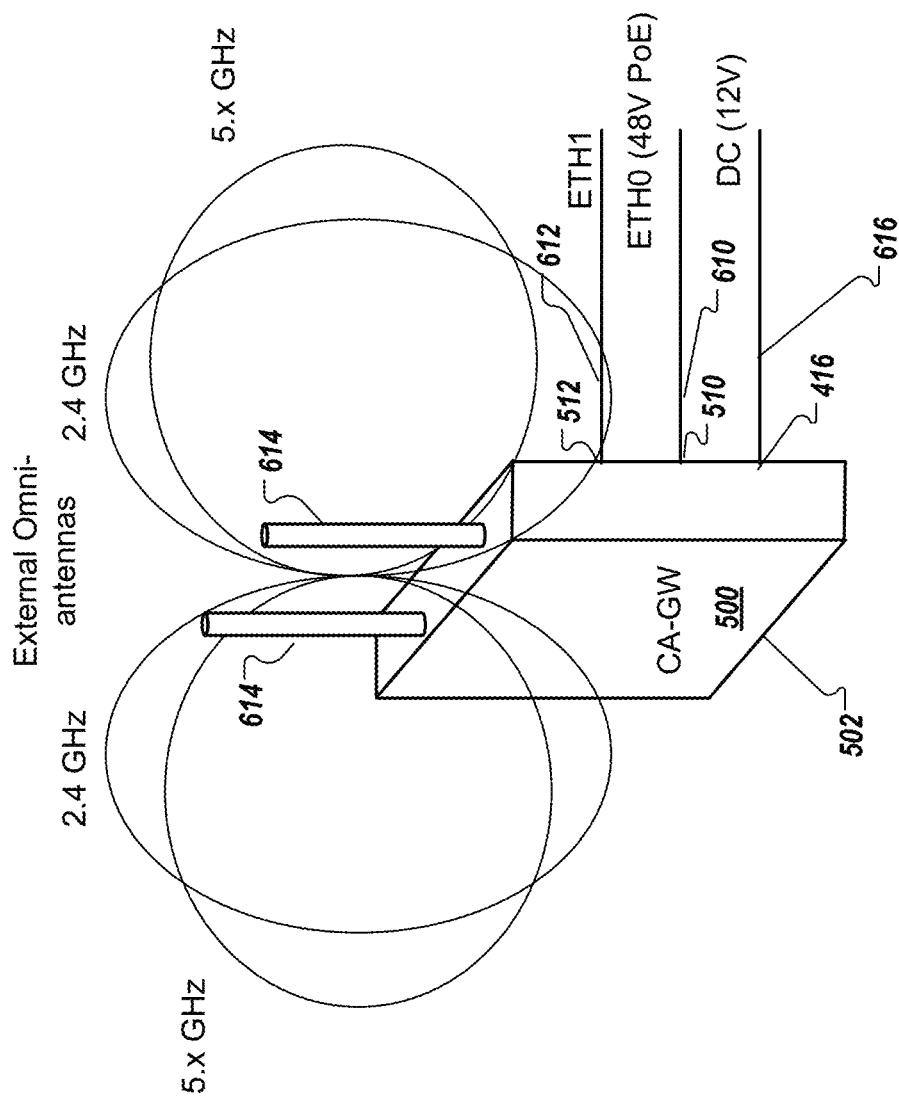
FIG. 6 illustrates the wireless network device being configured as the CA-GW according to one embodiment.

FIG. 6 illustrates the CA-GW 500 of FIG. 5 according to one embodiment. When the CA-GW 500 is disposed in a customer home, two external omnidirectional antennas 614 can be plugged into the RF connectors 514, an Ethernet cable 610 can be plugged into the network interface connector 510 (48V PoE)), and a power cable 616 can be plugged into the power connector 516. The external omnidirectional antennas 614 can radiate in the 2.4 GHz frequency band or the 5 GHz frequency band.

Figure 7:
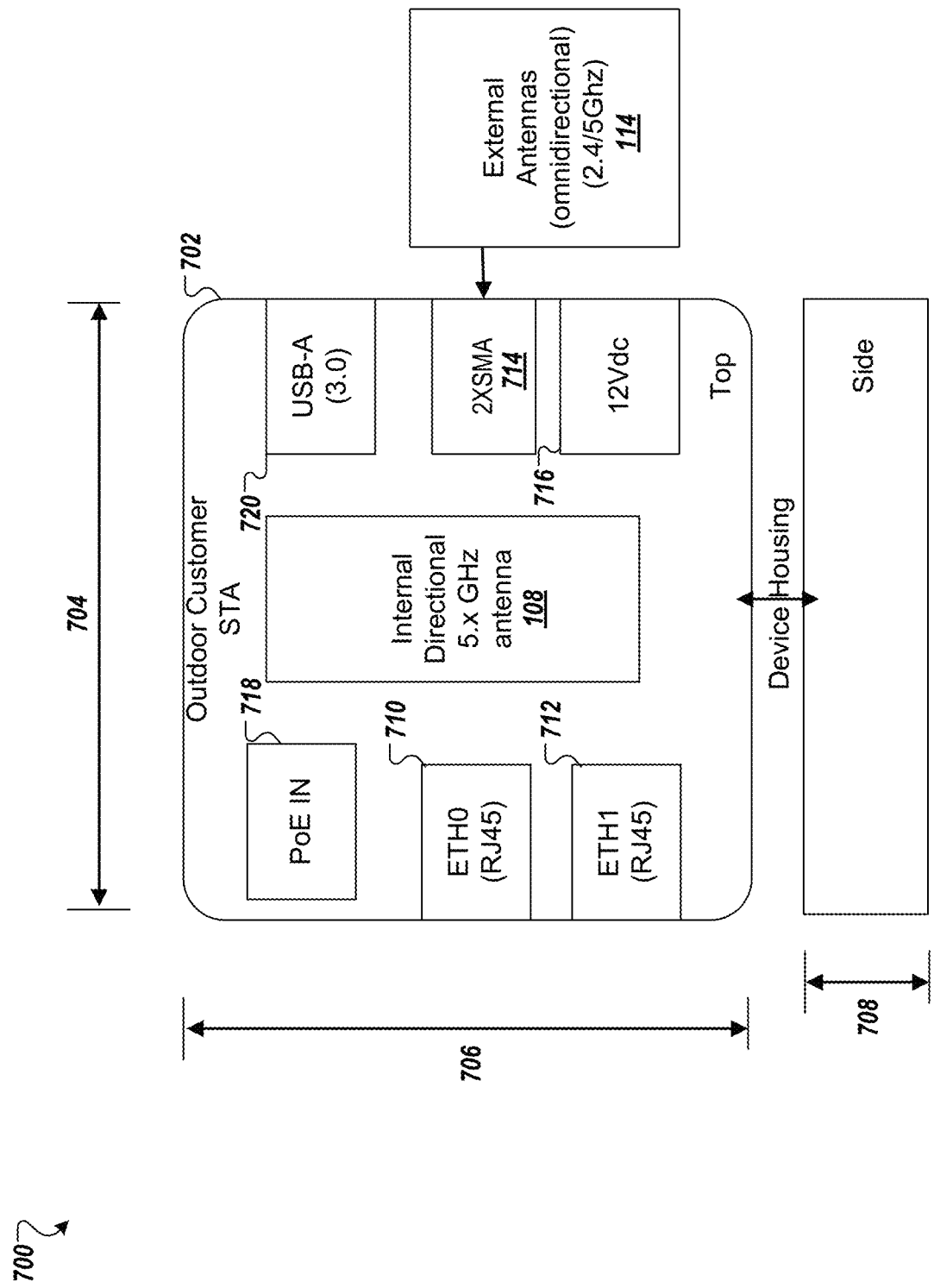
FIG. 7 is a block diagram of a wireless network device being configured as an outdoor station (STA) according to one embodiment.

FIG. 7 is a block diagram of a wireless network device being configured as an outdoor STA 700 according to one embodiment. The outdoor STA 700 can be a physical device SKU of an ODU 210, including a device housing 702 having a width 704 (e.g., 130-170 mm), a length 706 (e.g., 130-170 mm), and a height 708 (e.g., 20-40 mm). The outdoor STA 700 includes the first and second network interface connectors 710, 712, an RF connector(s) 714, and a power connector 716, a PoE controller 718, and a serial interface connector 720 such as described above with respect to FIG. 1. The RF connector(s) 714 is coupled to the external antenna(s) 114 (e.g., 2.4/5 GHz omnidirectional antenna). The outdoor STA 700 also includes the internal antenna(s) 108 (e.g., directional 5.x GHz antenna).

Figure 8:
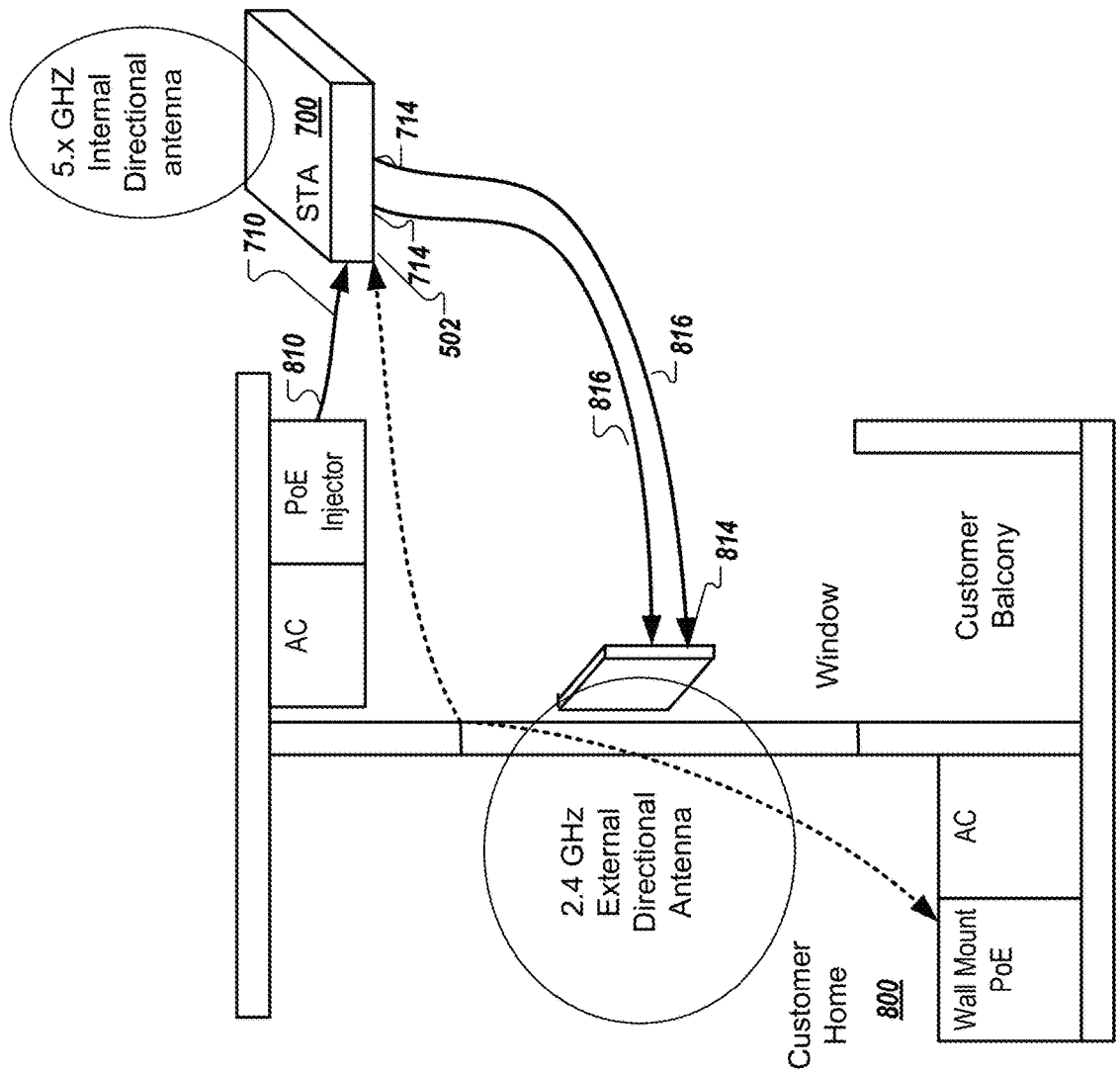
FIG. 8 illustrates the wireless network device being configured as the outdoor STA with an external directional antenna disposed on a window of a customer premises according to one embodiment.

FIG. 8 illustrates the outdoor STA 700 of FIG. 7 according to one embodiment. When the outdoor STA 700 is disposed outside of 800 a customer home, two external antennas 814 can be plugged into the RF connectors 714 via RF cables 816. An Ethernet cable 810 can be plugged into the network interface connector 710 (48V PoE). The external antennas 814 can be omnidirectional and can radiate in the 2.4 GHz frequency band and the internal antenna(s) 108 (not illustrated in FIG. 8) of the outdoor STA 700 can radiate in the 5 GHz frequency band. The external antennas 814 can be external directional antennas and the internal antenna(s) 108 can be internal directional antennas. Alternatively, the external antennas 814 can be omnidirectional antennas.

Figure 9:
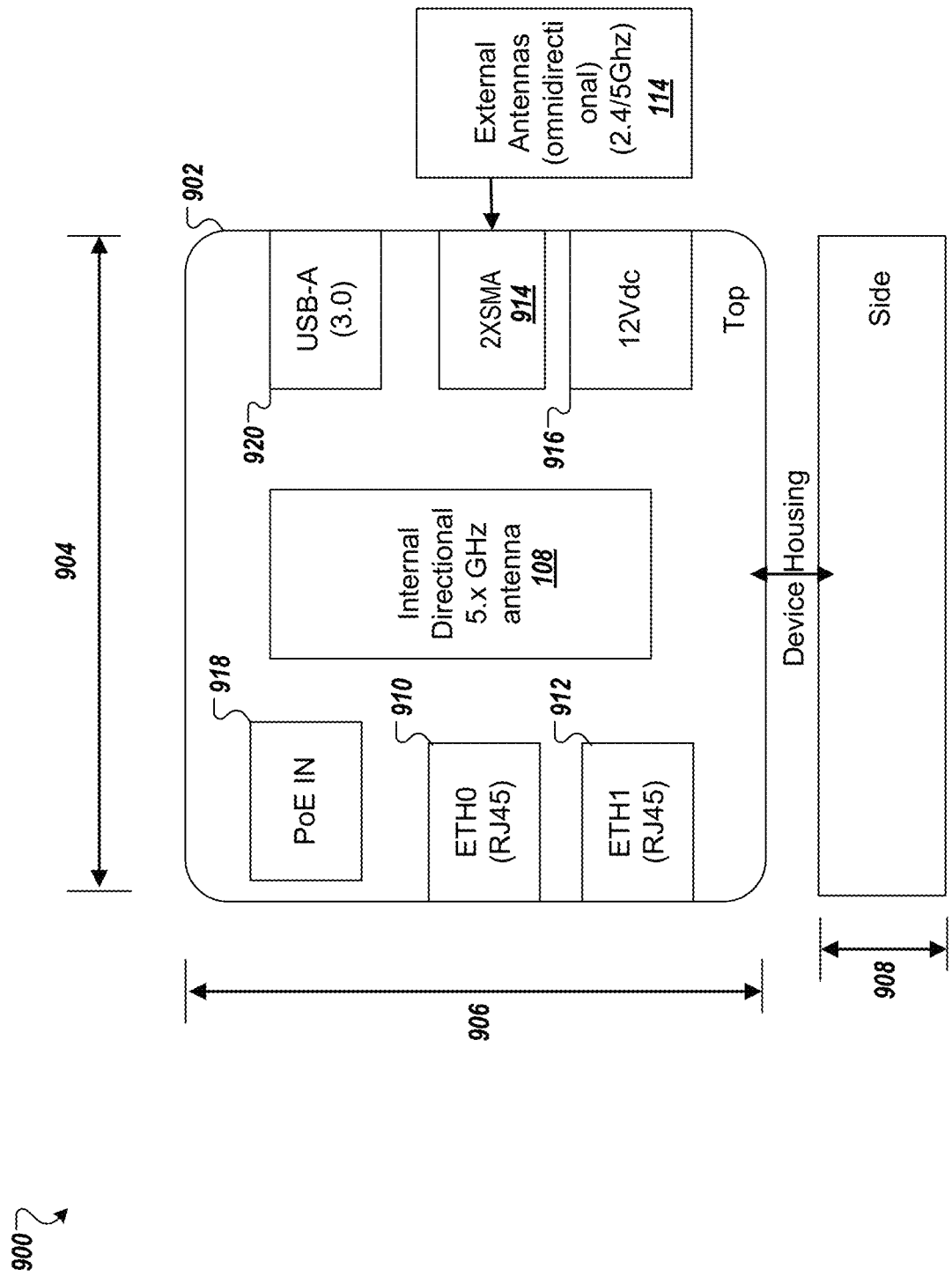
FIG. 9 is a block diagram of a wireless network device being configured as an outdoor unit (ODU) for a base station device, a relay device, or a gateway device according to one embodiment.

FIG. 9 is a block diagram of a wireless network device being configured as an outdoor unit (ODU) 900 for a base station device, a relay device, or a gateway device according to one embodiment. The ODU 900 is a physical device SKU, including a device housing 902 having a width 904 (e.g., 130-170 mm), a length 906 (e.g., 130-170 mm), and a height 908 (e.g., 20-40 mm). The ODU 900 includes the first and second network interface connectors 910, 912, an RF connector(s) 914, and a power connector 916, a PoE controller 918, and a serial interface connector 920 such as described above with respect to FIG. 1. The RF connector(s) 914 is coupled to the external antenna(s) 114 (e.g., 2.4/5 GHz omnidirectional antenna). The ODU 900 also includes the internal antenna(s) 108 (e.g., directional 5.x GHz antenna).

Figure 10:
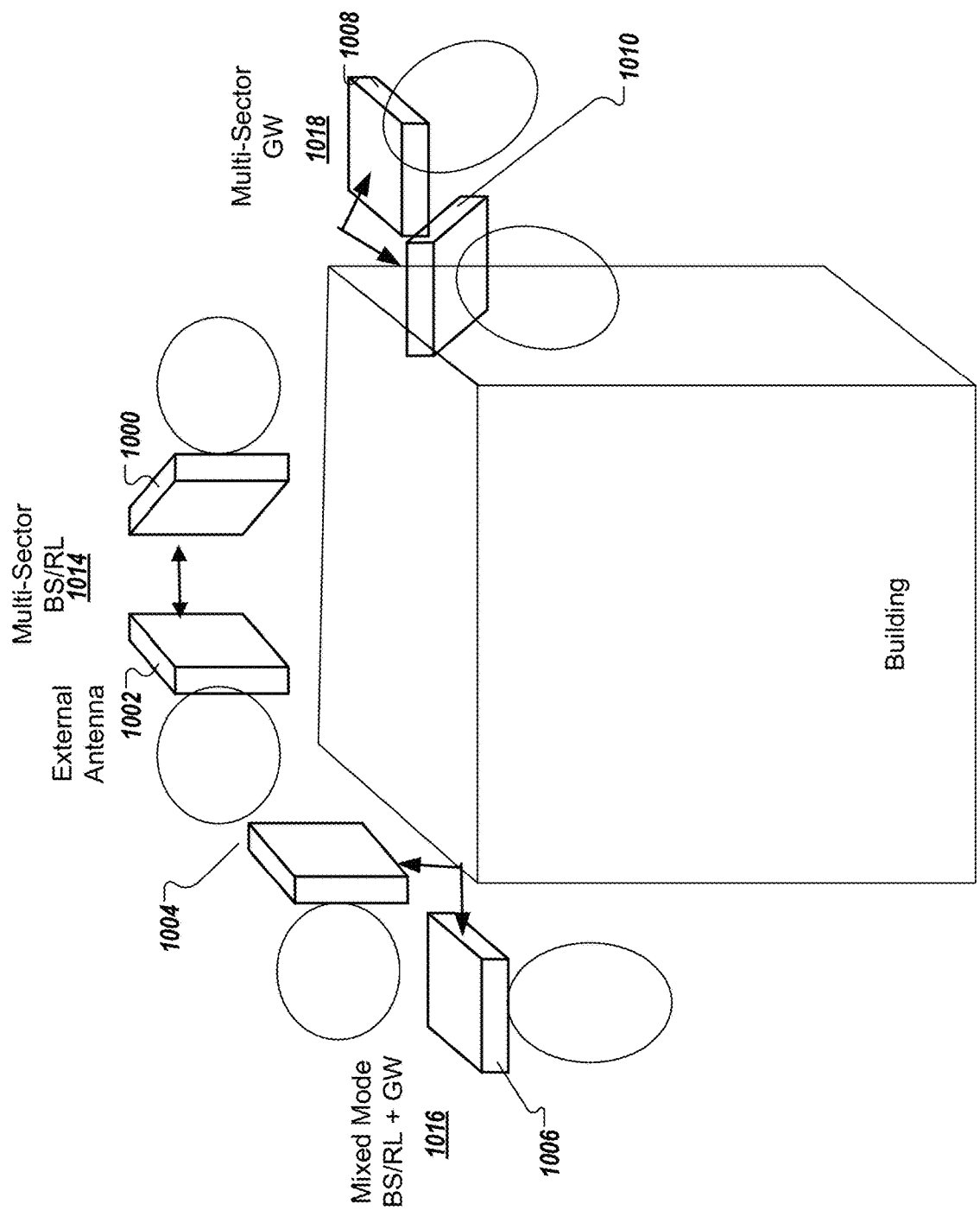
FIG. 10 illustrates three wireless network device being configured as ODUs in a multi-sector base station-relay (BS/RL) mode, a multi-sector GW mode, and a mixed mode according to one embodiment.

FIG. 10 illustrates three wireless network device being configured as ODUs 1000, 1004, 1008 in a multi-sector base station-relay (BS/RL) mode, a multi-sector GW mode, and a mixed mode according to one embodiment. The ODU 1000 includes an internal antenna that operates in the 5 GHz frequency band and RF connectors that connect to an external antenna 1002. The internal antenna can be a directional antenna disposed in a first plane and radiates electromagnetic energy in a first direction. The external antenna 1002 can be disposed in a second plane and radiates electromagnetic energy in a second direction, the second direction being in an opposite direction than the first direction. In this embodiment, the ODU 1000 is programmed to operate as a base station (BS) and a relay node (RL) in a multi-sector BS/RL mode 1014. The ODU 1000 can be disposed on a roof of a building 1012. The ODU 1000 can use the internal antenna for communication as the base station and can use the external antenna 1002 for communications as the relay node. In other embodiments, the ODU 1000 and external antenna 1002 can be disposed in other orientations. The ODU 1000 can be configured for the multi-sector BS/RL mode 1014 to provide backhaul functionality to multiple sectors. For example, the wireless network device can include RL functionality and base station functionality. The base station functionality can be provided to devices located in a first sector, such as in a first building, whereas the RL functionality can be provided to devices located in a second sector, such as a second building. In other embodiments, more than two sectors can be serviced by the single wireless network device.

The ODU 1004 includes an internal antenna that operates in the 5 GHz frequency band and RF connectors that connect to an external antenna 1006. The internal antenna can be a directional antenna disposed in a first plane and radiates electromagnetic energy in a first direction. The external antenna 1006 can be disposed in a second plane and radiates electromagnetic energy in a second direction, the second direction being orthogonal to the first direction. In this embodiment, the ODU 1004 is programmed to operate as a BS and a gateway (GW) or a RL and a GW in a (BS/RL+GW) mode 1016. The ODU 1004 can be disposed on the roof of the building 1012. The ODU 1004 can use the internal antenna for communication as the BS or RL and can use the external antenna 1006 for communications as the GW. The external antenna 1006 can be disposed on a side of the building 1012 and oriented to radiate electromagnetic energy from the roof down to devices that are disposed outside of the customer's home as described herein. In other embodiments, the ODU 1004 and external antenna 1006 can be disposed in other orientations. The ODU 1004 can be configured for the BS/RL+GW mode 1016 to provide multiple backhaul functionalities, including base station functionality, relay functionality, and gateway functionality in a single device. For example, the BS or RL functionality can use the internal antenna(s) to communicate with other devices as a BS or RL and the GW functionality can use the external antenna 1006 to communicate with other devices a GW. In this manner, the single wireless network device operates in a mixed mode.

The ODU 1008 includes an internal antenna that operates in the 5 GHz frequency band and RF connectors that connect to an external antenna 1010. The internal antenna can be a directional antenna disposed in a first plane and radiates electromagnetic energy in a first direction. The external antenna 1010 can be disposed in a second plane and radiates electromagnetic energy in a second direction, the second direction being at a specified angle from the first direction. In this embodiment, the ODU 1008 is programmed to operate as a GW in a multi-sector GW mode 1018. The ODU 1008 can be disposed on the roof of the building 1012 or on a side of the building 1012. The ODU 1004 can use the internal antenna for communication as a first GW and can use the external antenna 1010 for communications as a second GW. As depicted, the external antenna 1010 can be disposed on a side of the building 1012 along with the ODU 1008 and the external antenna 1010 and the ODU 1008 can be disposed at different angles to radiate electromagnetic energy from the roof down to devices in two different directions. For example, the ODU 1008 can communicate with a first device that is outside a first customer's home at a first location using the internal antenna and can communicate with a second device that is outside a second customer's home at a second location. In other embodiments, the ODU 1008 and external antenna 1010 can be disposed in other orientations. The ODU 1008 can be configured for the multi-sector GW mode 1018 to provide GW functionality to multiple sectors. For example, the wireless network device can include GW functionality for devices located in a first sector, such as in a first building, and provide GW functionality for devices located in a second sector, such as a second building. In this manner, the single wireless network device operates as two separate gateways for two sectors. In other embodiments, more than two sectors can be serviced by the single wireless network device.

Figure 11:
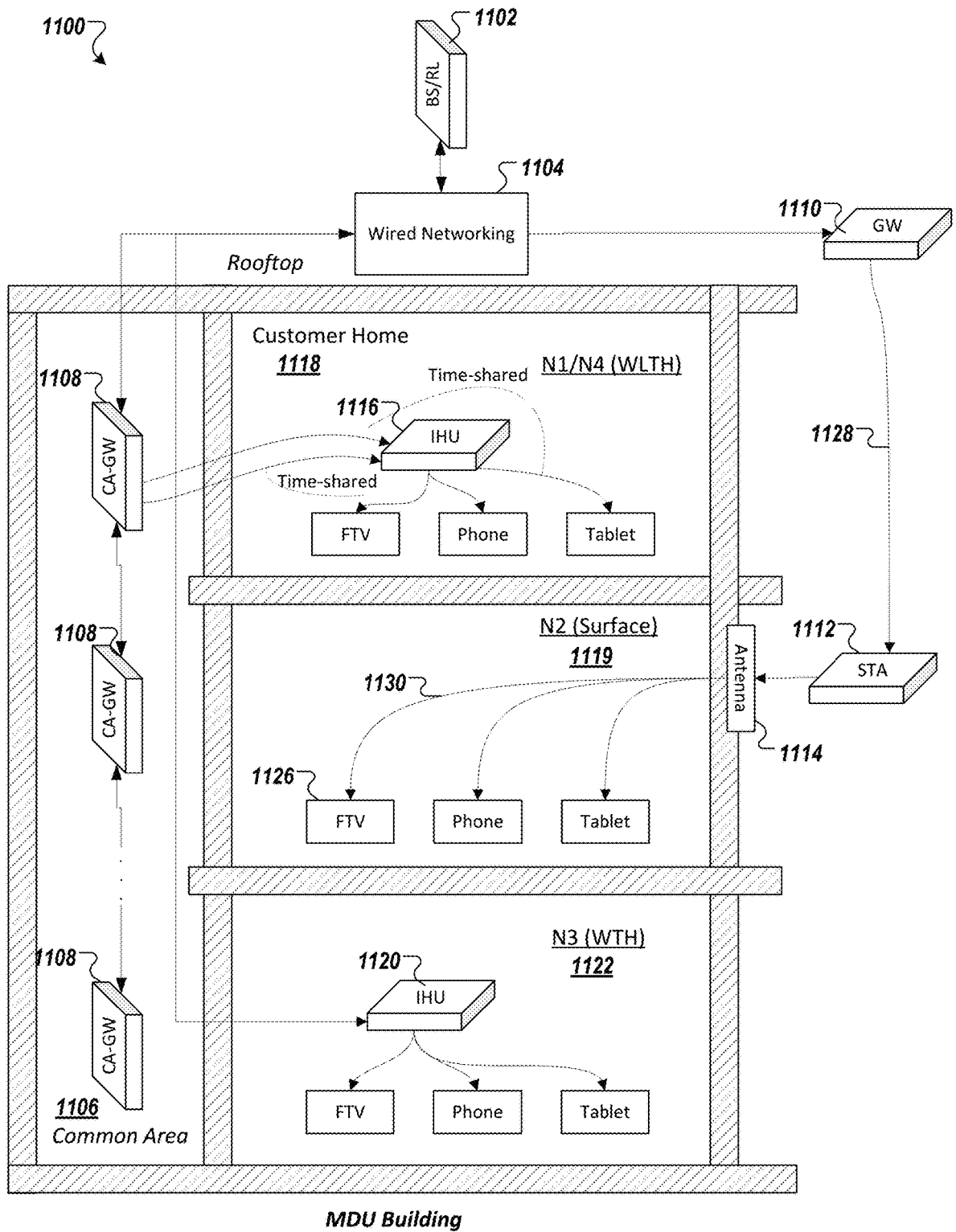
FIG. 11 is a network diagram of network devices deployed at a multiple dwelling unit (MDU) according to another embodiment.

FIG. 11 is a network diagram of network devices deployed at a MDU 1100 according to another embodiment. At the MDU 1100, there is either a base station (BS) device or a relay (RL) device, hereinafter referred to as a BS/RL device 1102, disposed on a roof of the MDU 1100. The BS/RL device 1102 is coupled to wired networking 1104. The wired networking 1104 can include a PoE switch, a NAS storage device, or the like.

The wired networking 1104 can extend along the roof of the MDU 1100, as well as in common areas 1106 of the MDU 1100. The wired networking 1104 can connect the BS/RL device 1102 to one or more common area gateway devices 1108 (CA-GW) in the common areas 1106, as well as one or more gateway devices 1110 on the roof. The CA-GW 1108 can be connected to one another via wired or wireless connections. For example, the CA-GWs 1108 can be daisy chained over Ethernet in a ring topology for redundancy. The CA-GW 1108 can connect to CPE within a customer's home over wired connections or wireless connections (e.g., 5.x GHz) in various manners, referred to herein as MDU options: N1-N4. For example, the gateway device 1110 on the roof can wireless connect to an outdoor customer station 1112 along a surface of the MDU 1100 (referred to as N2 network (surface)). The outdoor customer station 1112 can operates as an access point to other endpoint devices (CPE) within a customer's home 1119 (i.e., the customer premise), such as a tablet, a phone, an entertainment device, or the like. The access point can communicate with these devices over the 2.4 GHz frequency band using the external antenna 1114. The outdoor customer station 1112 also includes an internal directional antenna that is used to communicate with the gateway device 1110 on the roof along the surface (or external to the building) of the MDU 1100. The outdoor customer station 1112 can be a customer-installed ODU that uniquely provides customer connectivity over an external, directional 2.4 GHz antenna. The ODU can provide physical security and environmental seal. As described herein, the ODU can use the single PCB design architecture that supports multiple network roles through software configuration.

In another implementation, one of the CA-GWs 1108 can be wirelessly connect to an indoor customer station 1116 (also referred to as IU) within a customer home 1118 (referred to herein as N1/N4 network (WLTH)). The indoor customer station 1116 can operate as an access point to other endpoint devices within the customer premises, such as a tablet, a phone, an entertainment device, or the like. The access point can communicate with these devices over the 2.4 GHz frequency band and/or the 5 GHz frequency band using the internal antenna(s) or external antenna(s). A second indoor customer station 1120 in a second customer home 1122 can included a wired connection to the BS/RL device 1102 via the wired networking 1104 (referred to herein as N3 network (WTH)). The second indoor customer station 1120 can operate as an access point to other endpoint devices within the customer premises, such as a tablet, a phone, an entertainment device, or the like. The access point can communicate with these devices over the 2.4 GHz frequency band and/or the 5 GHz frequency band using the internal antenna(s) or external antenna(s).

In one embodiment, the outdoor customer station 1112 includes a processor, a 2.4 GHz WLAN radio, a 5 GHz WLAN radio, a first internal antenna coupled to the 5 GHz WLAN radio, and an external antenna port coupled to the 2.4 GHz WLAN radio. The external antenna port(s) can be SubMinature version A (SMA) connectors that are coaxial RF connectors with a screw-type coupling mechanism. Alternatively, other RF connectors can be used. The external antenna 1114 is coupled to the 2.4 GHz WLAN radio via a RF cable coupled to the external antenna port. The external antenna 1114 is mounted on an exterior surface of the MDU 1100 and the outdoor customer station 1112 is mounted outside of the MDU, such as on a pole that extends out from the building. The outdoor customer station 1112 can be mounted on an exterior surface of the building, on a pole, or on other structure associated with the building. The gateway device 1110 includes a second processor, a third WLAN radio, a second internal antenna coupled to the third WLAN radio, and a wired port coupled to a network switch in the wired networking 1104. The gateway device 1110 is mounted outside of the building, such as on a pole that extends out from the MDU 1100. A CPE station 1126 includes a fourth WLAN radio and a third antenna coupled to the fourth WLAN radio. The CPE station 1126 is located inside the building, such as in the customer's home 1119. The first processor of the outdoor customer station 1112 establishes a first wireless link 1128 between the 2.4 GHz WLAN radio and the third WLAN radio of the gateway 1110. The first wireless link 1128 can be a line-of-sight (LOS) link outside of the MDU 1100. For example, the outdoor customer station 1112 can use a radiation pattern of electromagnetic energy focused along the exterior surface of the MDU 1100. The first wireless link can be a non-line-of-sight (NLOS) link outside of the building or a near-line-of-sight (nLOS) link. A nLOS link can have a partially obstructed path between the location of the transmitter and the location of the receiver, whereas the NLOS link can be obstructed by a wall, a structure, or the like. The first processor of the outdoor customer station 1112 establishes a second wireless link 1130 between the 5 GHz WLAN radio and the fourth WLAN radio of the CPE station 1126. The second wireless link 1130 is either a LOS link through at least a window of the building or a NLOS link through or around a single wall or single floor of the building. in this embodiment, the internal antennas of the outdoor customer station 1112 is disposed on a first plane, such as the plane of the PCB within the outdoor customer station 1112, and the external antenna 1114 is disposed on a second plane, such as on an exterior surface of the MDU 1100. The second plane can be orthogonal or approximately orthogonal to the first plane. The exterior surface could be a window or an external wall of the customer's home 1119. Alternatively, the external antenna 1114 can be mounted on another structure, such as a structure on a balcony of the customer's home 1119.

It should be noted that the various devices described above can use a single device architecture that is capable of providing one of many functionalities, e.g., BS, RL, BS/RL, GW, CA-GW, IDU, outdoor customer station, or the like. The single device architecture is also capable of providing one of various multi-sectors and mixed modes, e.g., multi-sector BS/RL mode, BS/RL+GW mode, multi-sector GW mode, or the like. The single device architecture can also satisfy indoor and outdoor device-use cases with similar or different devices housings, such as a first device housing for IDUs and a second device housing for ODUs that provide physical and environmental protections. The various devices can include identical hardware in the single device architecture. The identical hardware can be programmed to operate according to the various device roles as described herein. The technologies of the devices described herein overcome the problems in fixed wireless networks that are composed of devices that provide different coverage and connectivity profiles, such as a PtMP access point (AP) that provides wide RF coverage to multiple clients, a PtP device that provides narrow coverage from a client to an AP or for backhaul functionality, or a multi-sector (PtP or PtMP) or mixed mode (PtP and PtMP) functionality that may be needed for a particular network architecture. In the context of wireless communications, backhaul functionality that a network device uses to transport data between a wireless access point and other nodes in a network, such as transportation of data between the wireless access point and a public network (e.g., Internet). For example, a wireless network device with backhaul functionality can establish a backhaul connection with another wireless network device in the network. A wireless network device with AP functionality can establish a connection with a client device. A wireless network device can include both backhaul functionality and AP functionality.

As illustrated in FIG. 11, the outdoor customer station 1112 is a wireless network device that can be programmed to operate as an outdoor CPE station that uses the external antenna 1114 on a window/wall of the building and connects with the gateway device 1110 for backhaul connectivity and provides AP functionality for multiple clients within the building. The wireless network device includes a housing with one or more RF connectors and a circuit board. The one or more RF connectors are coupled to one or more external antennas 114 via one or more RF cables. The circuit board is disposed within the housing and can include the single device architecture described herein. The circuit board can include a first antenna, a first radio coupled to the first antenna, a second radio coupled to the RF connector, a processor, and a memory device. The memory device can store device settings to configure the wireless network device to operate as the outdoor CPE station that is mounted outside of a dwelling unit (MDU 1100). The external antenna 1114 is mounted on an exterior surface of the dwelling unit and coupled to the RF connector via an RF cable. The processor establishes a first wireless link between the first radio and a radio of a second device via the first antenna that is internal to the housing. The second device can also be a second wireless network device that is programmed to operate as a gateway that is mounted on a first exterior surface of a building, such as illustrated in FIG. 11 with the gateway device 1110. The processor also establishes a second wireless link between the second radio and a radio of a third device via the external antenna 1114. The external antenna 1114 can be mounted on a second exterior surface of the building and coupled to the RF connector via an RF cable. The third device is located inside the building and is either an indoor CPE station or a wireless endpoint device. The outdoor customer station 1112, the gateway device 1110, and the indoor customer station can all include identical hardware. In one embodiment, the first radio only includes a first CPU, a first transceiver, a first BPF, a first LPF, the first antenna, a second transceiver, a second BPF, and a second LPF. The second radio only includes a second CPU, a third transceiver, a third BPF, a third LPF, the RF connector, a fourth transceiver, a fourth BPF, and a fourth LPF.

In another embodiment, the wireless network device of the outdoor customer station 1112 can be repurposed to another device role or to perform different functionalities. The memory device can store additional device settings to re-configure the wireless network device to operate as one of a BS, a RL, a GW, a CA-GW, an indoor CPE station, or the like.

In addition to being programmed to operate as an outdoor CPE station (e.g., 1112), a wireless network device with the single device architecture can be configured as an IHU, CA-GW, STA, BS, RL, or GW, a mixed mode, a multi-sector mode, or the like. In one embodiment, a wireless network device includes a housing with an RF connector and a circuit board disposed within the housing. The circuit board include a first antenna, a first radio coupled to the first antenna, a second radio coupled to the RF connector, a processor, and a memory device, wherein the memory device is to store device settings to configure the wireless network device to operate as an outdoor CPE station when mounted outside of a dwelling unit, an indoor CPE station when disposed within the dwelling unit, a CA-GW when disposed in a common area of the dwelling unit, or a base station, relay, or gateway (BS-RL-GW) when disposed on a roof of the dwelling unit. The processor can receive a command that identifies a device role for the wireless network device. Responsive to the command, the processor configures the wireless network device according to the device role using the device settings. In general, the processor can configured the wireless network device to connect to two or more devices via wired or wireless links. For example, the processor can connect to a second device via a first wireless link between the first radio and a radio of the second device, connect to a third device via a second wireless link between the second radio and a radio of the third device via the second antenna, and/or connect to a network switch over a wired link between the wireless network device and the network switch, the network switch being coupled to at least a fourth device.

In one implementation, responsive to the device role in the command identifying the outdoor CPE station, the processor establishes the first wireless link between the first radio and the radio of the second device via the first antenna, where the second device is a second wireless network device that is programmed to operate as a gateway and establishes the second wireless link between the second radio and the radio of the third device via the second antenna, where the third device is wireless endpoint device that is located inside of the dwelling unit.

In another implementation, responsive to the device role in the command identifying the indoor CPE station as a wireless indoor CPE station, the processor establishes the first wireless link between the first radio and the radio of the second device via the first antenna, where the second device is a second wireless network device that is programmed to operate as a CA-GW. The CA-GW is located in the common area of the dwelling unit and the wireless indoor CPE station is located within a customer home within the dwelling unit. The processor also establishes the second wireless link between the second radio and the radio of the CA-GW via the second antenna and establishes a third wireless link between the first radio and a radio of a first wireless endpoint device located within the customer home. The first wireless link and the third wireless link are time-shared wireless links. The processor also establishes a fourth wireless link between the second radio and a radio of a second wireless endpoint device located within the customer home. The second wireless link and the fourth wireless link are time-shared wireless links.

In another implementation, responsive to the device role in the command identifying the CA-GW, the processor establishes the wired link between the CA-GW and the fourth device via the network switch, where the fourth device is a second wireless network device that is programmed to operate as a base station or a relay. The base station or the relay is located on the roof and the CA-GW is located in the common area. The processor also establishes the first wireless link between the first radio and the radio of the second device via the first antenna, where the second device is a third wireless network device that is programmed to operate as a wireless indoor CPE station. The wireless indoor CPE station is located within a customer home within the dwelling unit. The processor also establishes the second wireless link between the second radio and the radio of the wireless indoor CPE station.

In another implementation, responsive to the device role in the command identifying a BS/RL in the multi-sector BS/RL mode, the processor establishes the wired link between the BS/RL and the fourth device via the network switch, where the fourth device is a second wireless network device that is programmed to operate as a gateway or a CA-GW. The BS/RL and the gateway are located on the roof and the CA-GW is located in the common area. The processor also establishes the first wireless link between the first radio and the radio of the second device via the first antenna, where the second device is a third wireless network device that is programmed to operate as a second BS/RL. The second BS/RL is located on a roof of a second dwelling unit. The processor also establishes the second wireless link between the second radio and the radio of the third device via the second antenna, where the third device is a fourth wireless network device that is programmed to operate as a third BS/RL. The third BS/RL is located on a roof of a third dwelling unit.

In another implementation, responsive to responsive to the device role in the command identifying the BS/RL+GW in a mixed BS/RL+GW mode, the processor establishes the wired link between the BS/RL+GW and the fourth device via the network switch, where the fourth device is a second wireless network device that is programmed to operate as a gateway or a CA-GW. The BS/RL+GW and the gateway are located on the roof and the CA-GW is located in the common area. The processor also establishes the first wireless link between the first radio and the radio of the second device via the first antenna, where the second device is a third wireless network device that is programmed to operate as a second BS/RL. The second BS/RL is located on a roof of a second dwelling unit. The processor also establishes the second wireless link between the second radio and the radio of the third device via the second antenna, where the third device is a fourth wireless network device that programmed as an outdoor CPE station. The outdoor CPE station is mounted to an exterior surface of the dwelling unit.

In another implementation, responsive to the device role in the command identifying the gateway in a multi-sector GW mode, the processor establishes the wired link between the gateway and the fourth device via the network switch, where the fourth device is a second wireless network device that is programmed to operate as a BS/RL. The gateway and the BS/RL are located on the roof. The processor also establishes the first wireless link between the first radio and the radio of the second device via the first antenna, where the second device is a third wireless network device that is programmed to operate as a first outdoor CPE station. The outdoor CPE station is mounted to an exterior surface of the dwelling unit outside a first customer home. The processor also establishes the second wireless link between the second radio and the radio of the third device via the second antenna, where the third device is a fourth wireless network device that is programmed as a second outdoor CPE station. The second outdoor CPE station is mounted to the exterior surface outside a second customer home.

In another implementation, responsive to the device role in the command identifying the indoor CPE station as a wired indoor CPE station, the processor establishes the wired link between the wired indoor CPE station and the fourth device via the network switch, where the fourth device is a second wireless network device that is programmed to operate as a BS/RL. The BS/RL is located on the roof and the wired indoor CPE station is located within a customer home within the dwelling unit. The processor also establishes the first wireless link between the first radio and the radio of the second device via the first antenna, where the second device is a first wireless endpoint device that is located within a customer home within the dwelling unit. The processor also establishes the second wireless link between the second radio and the radio of the third device via the second antenna, where the third device is a second wireless endpoint device that is located within the customer home.

The devices described above with respect to FIGS. 1-11 can be part of a wireless network that is logically organized into a hierarchal topology. In one embodiment, the devices can be logically organized into a cascaded ring topology that includes the following hierarchical units: cells, nodes, and devices according to one embodiment. A "cell unit" is a collection of wired connections and wireless connections arranged in a cellular structure. It should be noted that cell unit is not a cell of a cellular wireless network. The cell unit is made up of smaller cell units, called pico-cell units, nano-cell units, and micro-cell units. As described herein, a pico-cell unit is a cell unit that includes customer premise equipment at customer premises (e.g., buildings, houses, or the like). The pico-cell unit is served by gateway devices from a single base station node or a relay node. A nano-cell unit is a cell unit that includes one or more pico-cell units. The nano-cell unit is served by base station devices from a single base station node. A micro-cell unit is a cell unit that includes one or more nano-cell units. The nano-cell units of the micro-cell are is connected via a wireless network. A "node" is a logical network building block that is subdivided into "infrastructure" (e.g., base station nodes, relay nodes, or the like) and "CPE." The wireless network can include the following "nodes:" a base station node (BSN), a relay node (RLN), a storage (NAS) node, and a CPE node (also referred to as a home access node (HAN). A BSN connects to an Internet Service Provider (ISP) ingress via a router device, provides a first coverage (e.g., BS coverage) to the RLN, and provides a second coverage (e.g., gateway coverage) to a first CPE node, such as CPE node. The RLN connects to the BSN through a relay device and provides a third coverage (e.g., gateway coverage) to a second CPE node. The CPE node can include one or more customer stations that provide one or more access points for one or more endpoint devices at the customer premises. In the cascaded star topology, the BSN can be a first-tier hub with respect to the RLN and the first CPE node. In addition, in the cascaded star topology, the RLN can be a second-tier hub with respect to the second CPE node. The cascaded star topology is a configuration of a star network that can use hubs on spokes of the star network to expand or cascade the network into additional star networks. Alternatively, the BSN, the RLN, and the CPE node(s) can be organized in other multi-star networks or other chained interface configurations. The wireless network can utilize wireless network devices that are each manufactured as a common device type (e.g., single SKU product) and programmed to operate according to a "device role." A "device role" is a set of specific network functions associated with one or more network devices, such as a primary wireless network device (also referred to herein as "wireless device," "network device," or "D2") that is configured according to a device role (e.g., a gateway device, a customer station, or the like). In various embodiments, the common device type can be programmed to operate according to one of the following device roles: RT, BS, RL, GW, STA, NAS, multi-sector GW, multi-sector BS/RL, or mixed BS/RL+GW, or the like. It should be noted that the nodes of the wireless network are logically organized, whereas nodes with multiple devices can be physically organized at a location of a customer premise, such as a SDU, a MDU, or at other buildings or structures as described herein.

The BS/RL connectivity can be through the connectivity of a nano-cell unit, and the devices below the BS/RL device 1102 are part of a pico-cell unit. The pico-cell unit can be sub-divided by customer device connectivity (GW-STA, or GW-endpoint). Each cell type can be further sectorized in order to increase network capacity while managing in-network interface. When there is no ability to synchronize transmission and reception windows in the wireless network, such as for Wi-Fi® based networks using Carrier-sense multiple access with collision avoidance (CSMA-CA), sectorization of the pico-cell and nano-cell units can increase network capacity and manage in-network interference, such as set forth in a pico-cell sectorization scheme and a nano-cell sectorization scheme.

Figure 12:
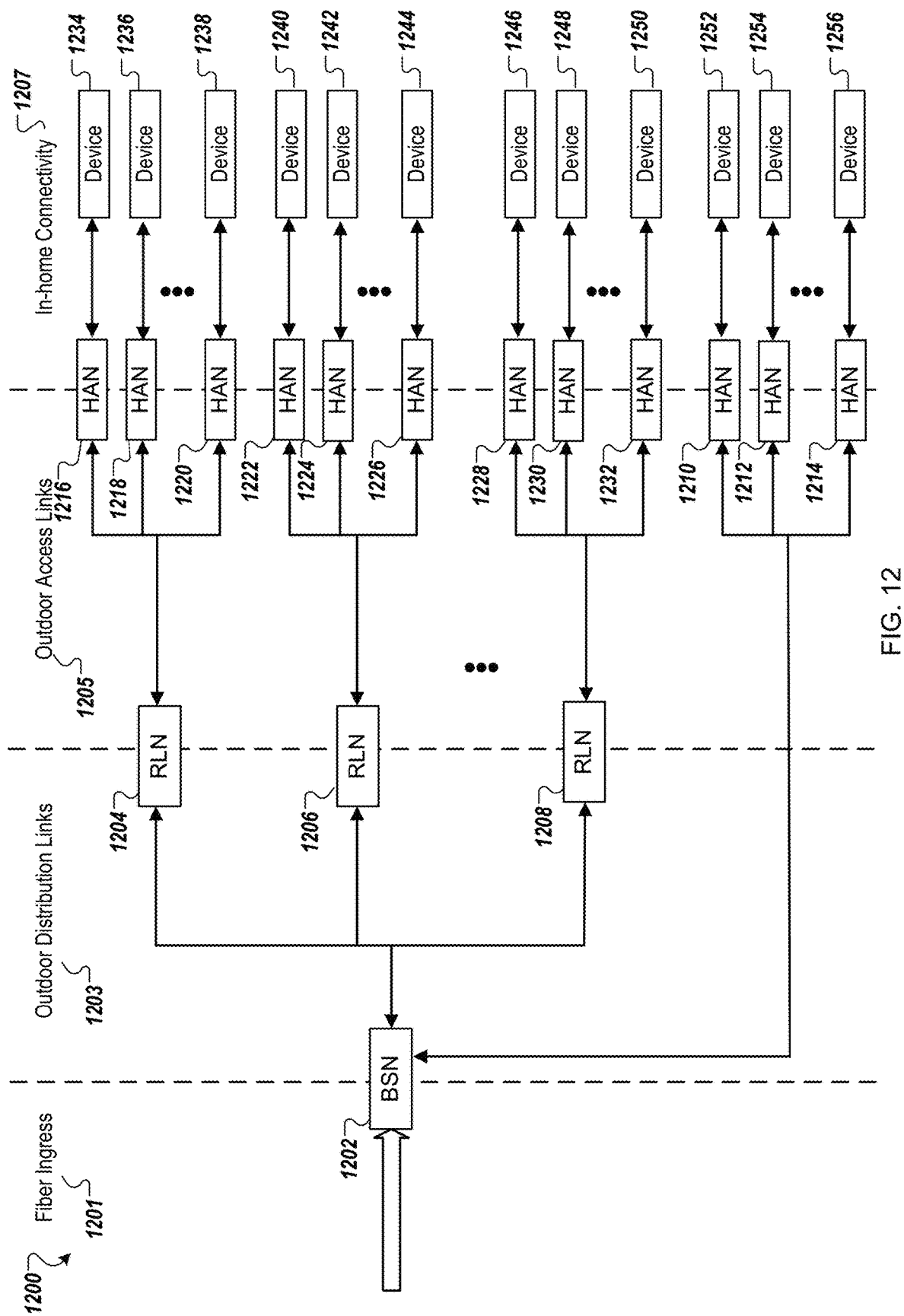
FIG. 12 is a network diagram of a wireless network with the three nodes types in a star topology according to one embodiment.

FIG. 12 is a network diagram of a wireless network 1200 with the three nodes types in a star topology according to one embodiment. The wireless network 1200 is a network architecture to deliver both VoD and internet to customers in limited-infrastructure regions, such as India. An ingress 1201 can be a high capacity ingress (typically fiber exchange) and a means of distribution to the customer using wired and wireless links. The network devices within the network are organized into three logical units known as nodes: BSNs, RLNs, and HANs. Wireless network 1200 includes a BSN 1202 that has a fiber ingress 1201 and uses outdoor distribution links 1203 to communicate with RLNs 1204, 1206, 1208. The BSN 1202 also uses outdoor access links 1205 to communicate with HANs 1210, 1212, 1214. The RLNs 1204, 1206, 1208 use outdoor access links 1205 to communicate with HANs 1216-1232. The HANs 1210-1232 use in-home connectivity 1207 to communicate with devices 1234-1256. Each node supports a unique set of network functions. The HAN provides connectivity for in-home customer devices (e.g., Fire TV, laptop, or the like) to the outdoor wireless access network (e.g., 1205). RLNs aggregate the HAN wireless access traffic and pass this data back to a central BSN 1202 over a wireless distribution network (e.g., 1203). BSNs aggregate both the RLN wireless distribution and local wireless access traffic. The BSN 1202 can also include a fiber ingress point (e.g., ingress 1201).

In one embodiment, the BSN 1202 can include a network switch and one or more wireless network device of the common device type. The one or more devices can include a base station device, a gateway device, and an optional storage device. The base station device is a wireless network device that is programmed to operate according to the BS device role. The gateway device is a wireless network device that is programmed to operate according to the GW device role. The storage device is a wireless network device that includes one or more attached storage mediums, such as USB connected storage media (e.g., HDD, SSD, or the like), is programmed to operate according to the NAS device role. That is, the storage device can be programmed to operate as a storage controller to the attached storage mediums. In one embodiment, the base station device (i.e., BS device role) can use one or more radios to provide a first multi-sector, point-to-multi-point (PtMP) coverage to one or more relay devices up to a first distance, the first distance being approximately 100 meters.

The RLNs 1204-1208 can include a network switch and multiple wireless devices of the common device type. The multiple wireless devices of the RLN can include a relay device, a gateway device, and an optional storage device. The relay device is a wireless network device that is programmed to operate according to the RL device role. The gateway device is a wireless network device that is programmed to operate according to the GW device role. The optional storage device is a wireless network device that includes one or more attached storage mediums, such as USB connected storage media (e.g., HDD, SSD, or the like), is programmed to operate according to the NAS device role. That is, the optional storage device can be programmed to operate as a storage controller to the attached storage mediums. By using common device types for these devices, flexible multi-use capability across the wireless network 1200 can be achieved with relatively low cost and ease of software development. It should also be noted that the common device type can be used for a router device, as well as the content storage functions. Alternatively, other types of devices can be used for the routing and storage functions of the wireless network 1200. The relay device can use one or more radios to provide a single sector, point-to-point (PtP) connectivity to the base station device up to a second distance, the second distance being approximately 100 meters. A first gateway device (at the BSN) can use one or more radios to provide a second multi-sector, PtMP coverage to one or more customer stations up to a third distance, the third distance being approximately 30 meters. A second gateway device (at the RLN) can use one or more radios to provide a third multi-sector, PtMP coverage to one or more additional customer stations up to a fourth distance, the fourth distance being approximately 30 meters. As noted above, one or more external storage mediums (at the BSN) can be coupled to the storage device and the storage device operates as a first storage controller to the one or more external storage mediums. Similarly, one or more additional external storage mediums are coupled to the optional storage device at the RLN and the second storage device operates as a second storage controller to the one or more external storage mediums.

The HAN nodes 1210-1232 can include one or more devices (referred to herein as customer premises equipment), including one or more customer stations and one or more endpoint devices. For example, the customer station can be the wireless network device that is manufactured according to the common device type and programmed to operate according to the customer STA device role. The one or more endpoint devices can be various types of wireless devices, such as mobile devices, smart TVs, TV dongles, watches, IoT devices, thermostats, home automation equipment, laptops, computers, entertainment consoles, gaming consoles, voice-controlled devices, or the like.

As described above, the wireless network 1200 can be logically organized according to the hierarchy illustrated in FIG. 12. Alternatively, the wireless network device of the wireless network 1200 can be organized logically and physically in other configurations and topologies.

Figure 13:
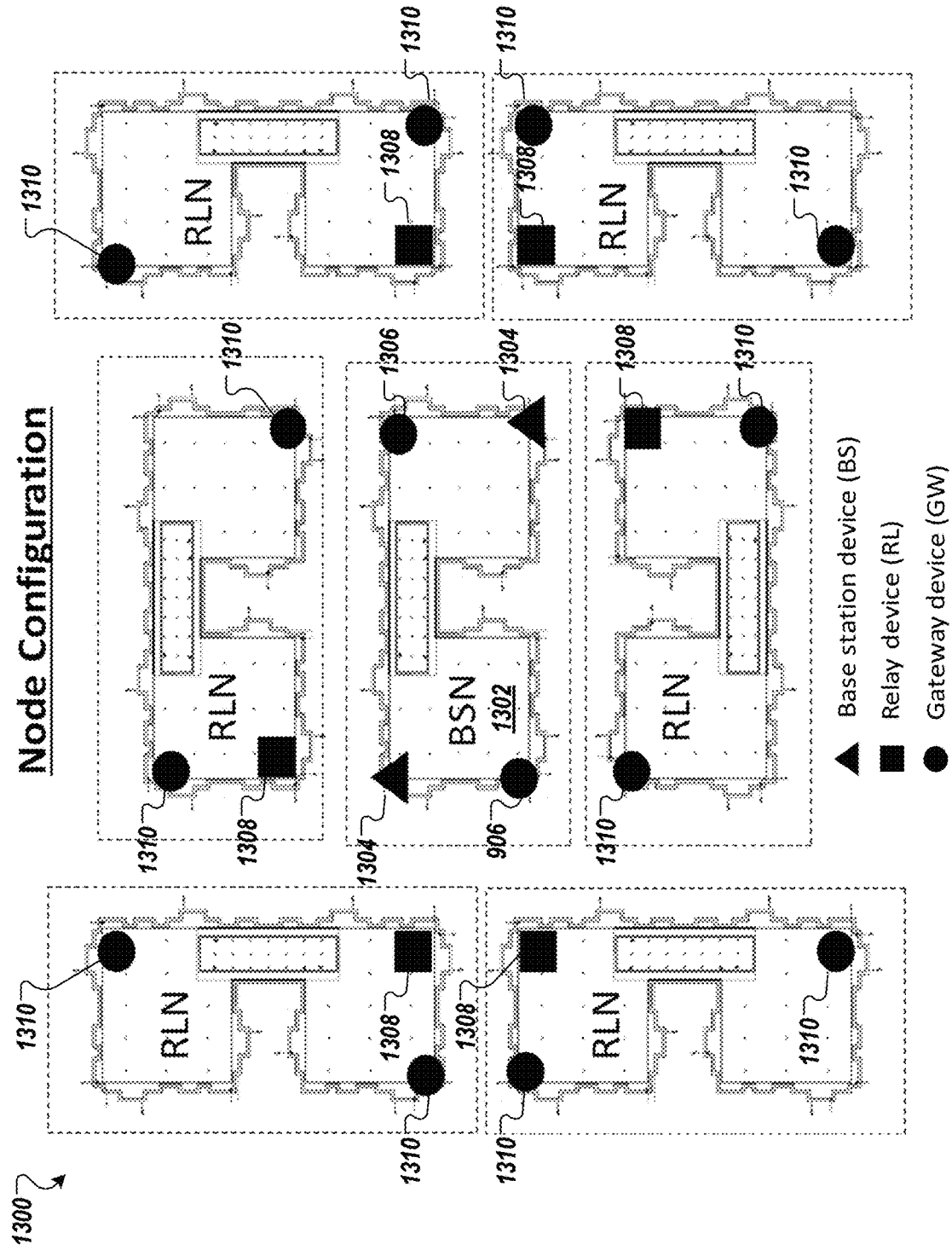
FIG. 13 illustrates an exemplary node configuration of a wireless network according to one embodiment.

FIG. 13 illustrates an exemplary node configuration 1300 of a wireless network according to one embodiment. In the node configuration 1300, there can be multiple nodes, one node per building. As illustrated, a first building includes a BSN 1302, including two base station devices 1304 and two gateway devices 1306. The five other buildings include a RLN 1308, each including at least one relay device 1310 and multiple gateway devices 1312.

Figure 14:
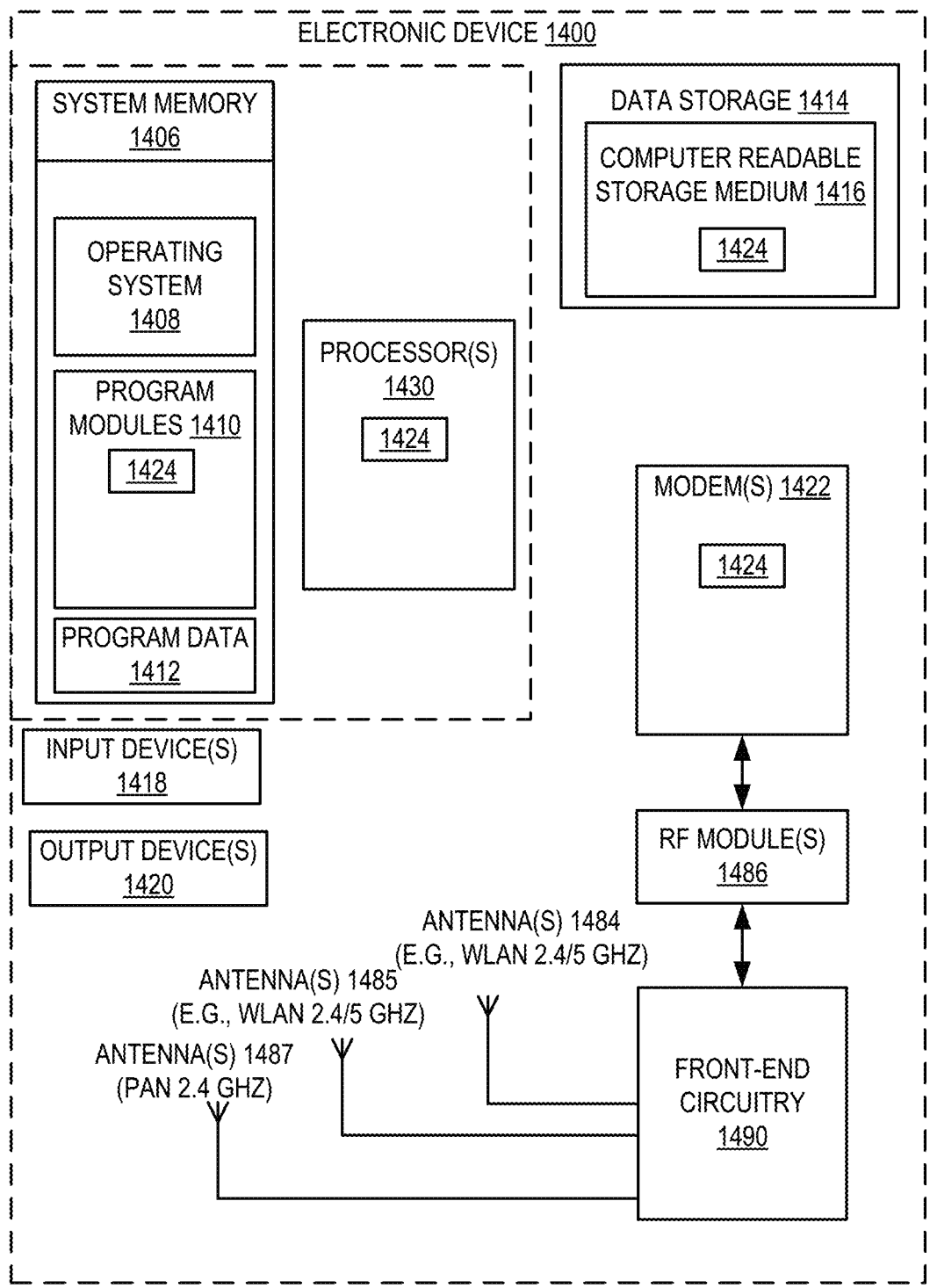
FIG. 14 is a block diagram of an electronic device that can be configured to operate as one of multiple device functionalities as described herein according to one embodiment.

FIG. 14 is a block diagram of an electronic device that can be configured to operate as one of multiple device functionalities as described herein according to one embodiment. The electronic device 1400 may correspond to the electronic devices described above with respect to FIGS. 1-13. Alternatively, the electronic device 1400 may be other electronic devices, as described herein.

The electronic device 1400 includes one or more processor(s) 1430, such as one or more CPUs, microcontrollers, field programmable gate arrays, or other types of processors. The electronic device 1400 also includes system memory 1406, which may correspond to any combination of volatile and/or non-volatile storage mechanisms. The system memory 1406 stores information that provides operating system component 1408, various program modules 1410, program data 1412, and/or other components. In one embodiment, the system memory 1406 stores instructions of methods to control operation of the electronic device 1400. The electronic device 1400 performs functions by using the processor(s) 1430 to execute instructions provided by the system memory 1406. In one embodiment, the program modules 1410 may include processing logic 1424. The processing logic 1424 may perform some or all of the operations descried herein.

The electronic device 1400 also includes a data storage device 1414 that may be composed of one or more types of removable storage and/or one or more types of non-removable storage. The data storage device 1414 includes a computer-readable storage medium 1416 on which is stored one or more sets of instructions embodying any of the methodologies or functions described herein. Instructions for the program modules 1410 (e.g., processing logic 1424) may reside, completely or at least partially, within the computer-readable storage medium 1416, system memory 1406 and/or within the processor(s) 1430 during execution thereof by the electronic device 1400, the system memory 1406 and the processor(s) 1430 also constituting computer-readable media. The electronic device 1400 may also include one or more input devices 1418 (keyboard, mouse device, specialized selection keys, etc.) and one or more output devices 1420 (displays, printers, audio output mechanisms, etc.).

The electronic device 1400 further includes a modem 1422 to allow the electronic device 1400 to communicate via a wireless connections (e.g., such as provided by the wireless communication system) with other computing devices, such as remote computers, an item providing system, and so forth. The modem 1422 can be connected to one or more radio frequency (RF) modules 1486. The RF modules 1486 may be a WLAN module, a WAN module, WPAN module, Global Positioning System (GPS) module, or the like. The antenna structures (antenna(s) 1484, 1485, 1487) are coupled to the front-end circuitry 1490, which is coupled to the modem 1022. The front-end circuitry 1490 may include radio front-end circuitry, antenna switching circuitry, impedance matching circuitry, or the like. The antennas 1484 may be GPS antennas, Near-Field Communication (NFC) antennas, other WAN antennas, WLAN or PAN antennas, or the like. The modem 1422 allows the electronic device 1400 to handle both voice and non-voice communications (such as communications for text messages, multimedia messages, media downloads, web browsing, etc.) with a wireless communication system. The modem 1422 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1xRTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1422 may generate signals and send these signals to antenna(s) 1484 of a first type (e.g., WLAN 5 GHz), antenna(s) 1485 of a second type (e.g., WLAN 2.4 GHz), and/or antenna(s) 1487 of a third type (e.g., WAN), via front-end circuitry 1490, and RF module(s) 1486 as descried herein. Antennas 1484, 1485, 1487 may be configured to transmit in different frequency bands and/or using different wireless communication protocols. The antennas 1484, 1485, 1487 may be directional, omnidirectional, or non-directional antennas. In addition to sending data, antennas 1484, 1485, 1487 may also receive data, which is sent to appropriate RF modules connected to the antennas. One of the antennas 1484, 1485, 1487 may be any combination of the antenna structures described herein.

In one embodiment, the electronic device 1400 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1422 is shown to control transmission and reception via antenna (1484, 1485, 1487), the electronic device 1400 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless network device comprising:
a housing comprising a radio frequency (RF) connector; and
a circuit board disposed within the housing, the circuit board comprising a first antenna, a first radio coupled to the first antenna, a second radio coupled to the RF connector, a processor, and a memory device, wherein the memory device is to store device settings to configure the wireless network device to operate as a first customer premise equipment (CPE) station, wherein the processor is configured to:
 establish a first wireless link between the first radio and a radio of a second device via the first antenna, wherein the second device is a second wireless network device that is programmed to operate as a gateway that is mounted on a first exterior surface of a building; and
 establish a second wireless link between the second radio and a radio of a third device via a second antenna mounted on a second exterior surface of the building and coupled to the RF connector via an RF cable, wherein the third device is located inside the building and is either a second CPE station or a wireless endpoint device, wherein each of the wireless network device, the second wireless network device, and the second CPE station comprises identical hardware.

2. The wireless network device of claim 1, wherein the memory device is further to store additional device settings to re-configure the wireless network device to operate as one of: a base station, a relay, a common-area gateway (CA-GW), or a gateway.

3. The wireless network device of claim 1, wherein:
the first radio comprises a first central processing unit (CPU) coupled to the processor, a first transceiver coupled to the first CPU, a first band pass filter (BPF) coupled to the first transceiver, a first low pass filter (LPF) coupled to the first BPF and the first antenna, a second transceiver coupled to the first CPU, a second BPF coupled to the second transceiver, and a second LPF coupled to the second BPF and the first antenna; and
the second radio comprises a second CPU coupled to the processor, a third transceiver coupled to the second CPU, a third BPF coupled to the third transceiver, and a third LPF coupled to the third BPF and the RF connector, a fourth transceiver coupled to the second CPU, a fourth BPF coupled to the fourth transceiver, and a fourth LPF coupled to the fourth BPF and a second RF connector, wherein:
 (i) the second RF connector is coupled to the second antenna via a second RF cable,
 (ii) the first BPF and the second BPF are configured to filter RF signals, received via the first antenna, within a first frequency range, (iii) the third BPF and the fourth BPF are configured to filter RF signals, received via the second antenna, within a second frequency range that is different than the first frequency range;
(iv) the first frequency range is the 5 GHz frequency band; and
(v) the second frequency range is the 2.4 GHz frequency band.

4. The wireless network device of claim 1, wherein the first antenna is a first directional antenna that is disposed on a first plane of the circuit board, wherein the second antenna is a second directional antenna that is disposed on a second plane of the second exterior surface, wherein the second plane is orthogonal to the first plane.

5. The wireless network device of claim 1, wherein:
the housing further comprises:
  a power connector;
  a serial interface connector;
  a first network interface connector;
  a second network interface connector; and
  a second RF connector coupled to the second radio;
the circuit board further comprises:
  a serial interface transceiver coupled between the processor and the serial interface connector; and
  a switch coupled between the processor and both of the first network interface connector and the second network interface connector.

6. The wireless network device of claim 1, wherein the second wireless link is a line-of-sight (LOS) wireless link.

7. The wireless network device of claim 1, wherein the second wireless link is a non-line-of-sight (NLOS) wireless link or a near-line-of-sight (nLOS) wireless link.

8. The wireless network device of claim 1, wherein:
the first radio is a first 2×2 multiple-input-multiple-output (MIMO) radio comprising a first MIMO port and a second MIMO port, the first MIMO port being coupled to a first element of the first antenna and the second MIMO port being coupled to a second element of the first antenna, wherein the first 2×2 MIMO radio communicates with the radio of the second wireless network device over the first wireless link; and
the second radio is a second 2×2 MIMO radio comprising a third MIMO port and a fourth MIMO port, the third MIMO port being coupled to a first element of the second antenna via the RF cable and the fourth MIMO port being coupled to a second element of the second antenna via a second RF cable, wherein the second 2×2 MIMO radio communicates with the radio of the third device over the second wireless link, wherein the second 2×2 MIMO radio communicates with a radio of a fourth device over a third wireless link, and wherein the fourth device is located inside the building.

9. The wireless network device of claim 1, wherein:
the first radio is a first 2×2 multiple-input-multiple-output (MIMO) radio comprising a first MIMO port and a second MIMO port, the first MIMO port being coupled to a first element of the first antenna and the second MIMO port being coupled to a second element of the first antenna, wherein the first 2×2 MIMO radio provides backhaul functionality between the wireless network device and the second wireless network device with a point-to-point (PtP) connection; and
the second radio is a second 2×2 MIMO radio comprising a third MIMO port and a fourth MIMO port, the third MIMO port being coupled to a first element of the second antenna via the RF cable and the fourth MIMO port being coupled to a second element of the second antenna via a second RF cable, wherein the second 2×2 MIMO radio provides access point (AP) functionality with a point-to-multi-point (PtMP) connection with at least the third device.

10. A wireless network device comprising:
a housing comprising a radio frequency (RF) connector; and
a circuit board disposed within the housing, the circuit board comprising a first antenna, a first radio coupled to the first antenna, a second radio coupled to the RF connector, a processor, and a memory device, wherein the memory device is to store device settings to configure the wireless network device to operate as a first customer premise equipment (CPE) station, wherein the processor is configured to:
  communicate first data with a radio of a second device using the first radio, wherein the second device is a gateway that is mounted on a first exterior surface of a building; and
  communicate second data with a radio of a third device using the second radio and a second antenna mounted on a second exterior surface of the building and coupled to the RF connector via an RF cable, wherein the third device is located inside the building and is either a second CPE station or a wireless endpoint device.

11. The wireless network device of claim 10, wherein each of the wireless network device, the second device, and the second CPE station comprises identical hardware, and wherein the memory device is further to store additional device settings to re-configure the wireless network device to operate as one of: a base station, a relay, a common-area gateway (CA-GW), or a gateway.

12. The wireless network device of claim 10, wherein:
the first radio comprises a first central processing unit (CPU) coupled to the processor, a first transceiver coupled to the first CPU, a first band pass filter (BPF) coupled to the first transceiver, a first low pass filter (LPF) coupled to the first BPF and the first antenna, a second transceiver coupled to the first CPU, a second BPF coupled to the second transceiver, and a second LPF coupled to the second BPF and the first antenna; and
the second radio comprises a second CPU coupled to the processor, a third transceiver coupled to the second CPU, a third BPF coupled to the third transceiver, and a third LPF coupled to the third BPF and the RF connector, a fourth transceiver coupled to the second CPU, a fourth BPF coupled to the fourth transceiver, and a fourth LPF coupled to the fourth BPF and a second RF connector, wherein:
(i) the second RF connector is coupled to the second antenna via a second RF cable,
(ii) the first BPF and the second BPF are configured to filter RF signals, received via the first antenna, within a first frequency range,
(iii) the third BPF and the fourth BPF are configured to filter RF signals, received via the second antenna, within a second frequency range that is different than the first frequency range;
(iv) the first frequency range is the 5 GHz frequency band; and
(v) the second frequency range is the 2.4 GHz frequency band.

13. The wireless network device of claim 10, wherein the first antenna is a first directional antenna that is disposed on a first plane of the circuit board, wherein the second antenna is a second directional antenna that is disposed on a second plane of the second exterior surface, wherein the second plane is orthogonal to the first plane.

14. The wireless network device of claim 10, wherein:
the housing further comprises:
   a power connector;
   a serial interface connector;
   a first network interface connector;
   a second network interface connector; and
   a second RF connector coupled to the second radio;
the circuit board further comprises:
   a serial interface transceiver coupled between the processor and the serial interface connector; and
   a switch coupled between the processor and both of the first network interface connector and the second network interface connector.

15. The wireless network device of claim 10, wherein:
the first radio is a first 2×2 multiple-input-multiple-output (MIMO) radio comprising a first MIMO port and a second MIMO port, the first MIMO port being coupled to a first element of the first antenna and the second MIMO port being coupled to a second element of the first antenna, wherein the first 2×2 MIMO radio communicates with the radio of the second device over the first wireless link; and
the second radio is a second 2×2 MIMO radio comprising a third MIMO port and a fourth MIMO port, the third MIMO port being coupled to a first element of the second antenna via the RF cable and the fourth MIMO port being coupled to a second element of the second antenna via a second RF cable, wherein the second 2×2 MIMO radio communicates with the radio of the third device, wherein the second 2×2 MIMO radio communicates with a radio of a fourth device over a third wireless link, and wherein the fourth device is located inside the building.

16. The wireless network device of claim 10, wherein:
the first radio is a first 2×2 multiple-input-multiple-output (MIMO) radio comprising a first MIMO port and a second MIMO port, the first MIMO port being coupled to a first element of the first antenna and the second MIMO port being coupled to a second element of the first antenna, wherein the first 2×2 MIMO radio provides backhaul functionality between the wireless network device and the second device with a point-to-point (PtP) connection; and
the second radio is a second 2×2 MIMO radio comprising a third MIMO port and a fourth MIMO port, the third MIMO port being coupled to a first element of the second antenna via the RF cable and the fourth MIMO port being coupled to a second element of the second antenna via a second RF cable, wherein the second 2×2 MIMO radio provides access point (AP) functionality with a point-to-multi-point (PtMP) connection with at least the third device.

17. A wireless device comprising:
a housing comprising a radio frequency (RF) connector; and
a circuit board disposed within the housing, the circuit board comprising a first antenna, a first radio coupled to the first antenna, a second radio coupled to the RF connector, a processor, and a memory device, wherein the memory device is to store device settings to configure the wireless device to operate as a first customer premise equipment (CPE) station, wherein the processor is configured to:
   send first data over a first wireless link between the first radio and a radio of a second device via the first antenna, wherein the second device is a gateway that is outside a building; and
   send second data over a second wireless link between the second radio and a radio of a third device via a second antenna that is outside the building and coupled to the RF connector via an RF cable, wherein the third device is located inside the building and is either a second CPE station or a wireless endpoint device.

18. The wireless device of claim 17, wherein each of the wireless device, the second device, and the third device comprises identical hardware, and wherein the memory device is further to store additional device settings to re-configure the wireless device to operate as one of: a base station, a relay, a common-area gateway (CA-GW), or a gateway.

19. The wireless device of claim 17, wherein:
the first radio comprises a first central processing unit (CPU) coupled to the processor, a first transceiver coupled to the first CPU, a first band pass filter (BPF) coupled to the first transceiver, a first low pass filter (LPF) coupled to the first BPF and the first antenna, a second transceiver coupled to the first CPU, a second BPF coupled to the second transceiver, and a second LPF coupled to the second BPF and the first antenna; and
the second radio comprises a second CPU coupled to the processor, a third transceiver coupled to the second CPU, a third BPF coupled to the third transceiver, and a third LPF coupled to the third BPF and the RF connector, a fourth transceiver coupled to the second CPU, a fourth BPF coupled to the fourth transceiver, and a fourth LPF coupled to the fourth BPF and a second RF connector, wherein:
(i) the second RF connector is coupled to the second antenna via a second RF cable,
(ii) the first BPF and the second BPF are configured to filter RF signals, received via the first antenna, within a first frequency range,
(iii) the third BPF and the fourth BPF are configured to filter RF signals, received via the second antenna, within a second frequency range that is different than the first frequency range;
(iv) the first frequency range is the 5 GHz frequency band; and
(v) the second frequency range is the 2.4 GHz frequency band.

20. The wireless device of claim 17, wherein the first antenna is a first directional antenna that is disposed on a first plane of the circuit board, wherein the second antenna is a second directional antenna that is disposed on a second plane of the building, wherein the second plane is orthogonal to the first plane.

* * * * *